United States Patent
Chen et al.

(10) Patent No.: US 10,075,983 B2
(45) Date of Patent: Sep. 11, 2018

(54) APPARATUS AND METHOD FOR ADJUSTING RANDOM ACCESS POWER CONTROL PARAMETER

(71) Applicant: HUAWEI TECHNOLOGIES CO., LTD., Shenzhen, Guangdong (CN)

(72) Inventors: Baojun Chen, Chengdu (CN); Li Xu, Chengdu (CN); Xin Feng, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 88 days.

(21) Appl. No.: 15/337,569

(22) Filed: Oct. 28, 2016

(65) Prior Publication Data
US 2017/0048892 A1 Feb. 16, 2017

Related U.S. Application Data

(63) Continuation of application No. PCT/CN2014/076607, filed on Apr. 30, 2014.

(51) Int. Cl.
*H04W 52/18* (2009.01)
*H04W 74/08* (2009.01)
(Continued)

(52) U.S. Cl.
CPC ....... *H04W 74/0841* (2013.01); *H04W 52/18* (2013.01); *H04W 52/362* (2013.01); *H04W 74/004* (2013.01); *H04W 84/042* (2013.01)

(58) Field of Classification Search
None
See application file for complete search history.

(56) References Cited

U.S. PATENT DOCUMENTS

2008/0259861 A1* 10/2008 Kang .................... H04W 52/50
370/329
2009/0286566 A1 11/2009 Lindholm et al.
(Continued)

FOREIGN PATENT DOCUMENTS

CN 102017723 A 4/2011
CN 102264150 A 11/2011
(Continued)

OTHER PUBLICATIONS

Supplementary European Search Report dated Mar. 15, 2017 in the corresponding European Application (14890733.0).
(Continued)

*Primary Examiner* — Duc T Duong
(74) *Attorney, Agent, or Firm* — Kilpatrick Townsend & Stockton LLP

(57) ABSTRACT

The embodiment of the present invention provides an apparatus and a method for adjusting a control parameter. The method in the embodiment of the present invention includes: obtaining, by a base station, random access information reported by multiple user equipment (UEs), where the random access information includes a contention conflict indication and a number of times of sending a preamble; collecting, by the base station, statistics on the random access information including contention conflict indication indicating a non-contention conflict; determining, by the base station, a first random access probability according to the random access information including contention conflict indication indicating a non-contention conflict; and adjusting, by the base station, a first random access power control parameter according to the first random access probability, where the first random access power control parameter is a preamble-initial-received-target-power.

20 Claims, 11 Drawing Sheets

(51) Int. Cl.
*H04W 52/36* (2009.01)
*H04W 74/00* (2009.01)
*H04W 84/04* (2009.01)

(56) References Cited

U.S. PATENT DOCUMENTS

| | | |
|---|---|---|
| 2010/0232318 A1 | 9/2010 | Sarkar |
| 2011/0235529 A1* | 9/2011 | Zetterberg ............ H04L 5/0053 370/248 |
| 2012/0051251 A1* | 3/2012 | Seo ..................... H04W 74/085 370/252 |
| 2012/0052898 A1* | 3/2012 | Hegge .................. H04W 74/04 455/511 |
| 2013/0121258 A1* | 5/2013 | Mukherjee .......... H04W 74/004 370/329 |
| 2014/0241285 A1* | 8/2014 | Pang ................. H04W 74/0833 370/329 |
| 2015/0057011 A1* | 2/2015 | Di Girolamo .... H04W 74/0808 455/454 |
| 2015/0319800 A1* | 11/2015 | Park ..................... H04L 1/1812 370/329 |
| 2016/0007377 A1* | 1/2016 | Frenne ................ H04W 56/001 370/329 |

FOREIGN PATENT DOCUMENTS

| | | |
|---|---|---|
| CN | 102685892 A | 9/2012 |
| CN | 103096355 A | 5/2013 |
| WO | 2010107354 A1 | 9/2010 |
| WO | 2012075848 A1 | 6/2012 |

OTHER PUBLICATIONS

"3GPP TS 36.213 V12.1.0": 3rd Generation Partnership Project; Technical Specification Group Radio Access Network; Evolved Universal Terrestrial Radio Access (E-UTRA); Physical layer procedures (Release 12), in Mar. 2014; 186 pages.

"3GPP TS 36.321 V12.1.0": 3rd Generation Partnership Project; Technical Specification Group Radio Access Network; Evolved Universal Terrestrial Radio Access (E-UTRA); Medium Access Control (MAC) protocol specification (Release 12), in Mar. 2014, 57 pages.

"3GPP TS 36.331 V12.1.0 ", 3rd Generation Partnership Project; Technical Specification Group Radio Access Network; Evolved Universal Terrestrial Radio Access (E-UTRA); R1dio Resource Control (RRC); Protocol specification (Release 12), in Mar. 2014, 356 pages.

International Search Report dated Feb. 11, 2015 in International Application No. PCT/CN2014/076607.

* cited by examiner

APPARATUS AND METHOD FOR ADJUSTING RANDOM ACCESS POWER CONTROL PARAMETER

CROSS-REFERENCE TEMPLATES

This application is a continuation of International Patent Application No. PCT/CN2014/076607, filed on Apr. 30, 2014, the disclosure of which is hereby incorporated by reference in its entirety.

TECHNICAL FIELD

The embodiment of the present invention relates to the communications field, and in particular, to an apparatus and a method for adjusting a random access power control parameter.

BACKGROUND

In a Long Term Evolution (LTE) system, user equipment (UE) sends a preamble to a base station in a random access process, and after receiving a preamble response message fed back by the base station to the UE, the UE accesses the base station.

The UE needs to send a random access preamble to the base station at a particular transmit power. A process of determining the transmit power for the random access preamble by the UE mainly includes the following two steps:

Step 1: The base station determines control parameters of the transmit power for sending the random access preamble by the UE.

The base station determines the control parameters (which are referred to as random access power control parameters below) of the transmit power for sending the random access preamble by the UE. The control parameters include a preamble-initial-received-target-power (preamble Initial Received Target Power), a power ramping step (power Ramping Step), and the like. The base station may use a system default control parameter, or may use a manually set control parameter.

The base station sends the determined random access power control parameters to the UE by using a system information block (SIB) message.

Step 2: The UE determines the transmit power for the random access preamble according to the random access power control parameters sent by the base station.

After obtaining the random access power control parameters by using the SIB message, the UE calculates the transmit power for the random access preamble according to the control parameters:

$$P_{PRACH} = \min\{P_{CMAX}, \text{PREAMBLE\_RECEIVED\_TARGET\_POWER} + PL\} \text{ [dBm]}$$

where $P_{PRACH}$ represents the transmit power for the random access preamble of the UE, and PRACH represents a physical random access channel (Physical Random Access Channel); $P_{CMAX}$ represents a maximum transmit power of the UE when the UE performs random access in a serving cell; PREAMBLE_RECEIVED_TARGET_POWER represents a preamble target received power; and PL represents a path loss (Path Loss) and $PL = P_{RS} - RSRP$, where $P_{RS}$ represents a reference signal transmit power, and RSRP is a reference signal received power; and a process of calculating the preamble target received power (PREAMBLE_RECEIVED_TARGET_POWER) is as follows:

PREAMBLE_RECEIVED_TARGET_POWER = preamble Initial Received Target Power+DELTA_PREAMBLE+(PREAMBLE_TRANSMISSION_COUNTER−1)*power Ramping Step where preamble Initial Received Target Power represents the preamble-initial-received-target-power, PREAMBLE_TRANSMISSION_COUNTER represents a number of times of sending a preamble in a random access process, power Ramping Step represents the power ramping step, and DELTA_PREAMBLE represents transmit power offsets in different preamble formats (preamble format), which are defined in Table 1 below:

TABLE 1

| Preamble format (Preamble Format) | Transmit power offset (DELTA_PREAMBLE) |
| --- | --- |
| 0 | 0 dB |
| 1 | 0 dB |
| 2 | −3 dB |
| 3 | −3 dB |
| 4 | 8 dB |

In the prior art, for a control parameter of a transmit power for a random access preamble of UE, regardless of whether a system default value or a manually set value is used, a value of the control parameter is fixed and cannot be adaptively adjusted according to an actual need; as a result, a delay of UE in a random access process is uncontrollable.

SUMMARY

Embodiments of the present invention provide an apparatus and a method for adjusting a random access power control parameter, so as to adaptively adjust a power control parameter and further control a delay of UE in a random access process to be within an expected range.

According to a first aspect, an embodiment of the present invention provides an apparatus for adjusting a random access power control parameter, including: a random access information obtaining unit, configured to obtain random access information reported by multiple user equipment (UEs), where the random access information includes a contention conflict indication and a number of times of sending a preamble; a random access information statistics collecting unit, configured to collect statistics on the random access information including contention conflict indication indicating a non-contention conflict; a random access probability determining unit, configured to determine a first random access probability according to the random access information including contention conflict indication indicating a non-contention conflict, where the first random access probability represents a probability of random access in which the number of times of sending a preamble is 1; and a control parameter adjustment unit, configured to adjust a first random access power control parameter according to the first random access probability, where the first random access power control parameter is a preamble-initial-received-target-power.

With reference to the first aspect, in a first possible implementation manner, the random access information statistics collecting unit is configured to: collect statistics on the random access information including contention conflict indication indicating a non-contention conflict, and obtain a number of times of random access in which the number of times of sending a preamble is 1; and collect statistics on the random access information including contention conflict indication indicating a non-contention conflict, and obtain a sum of a number of times of random access. The random access probability determining unit is configured to: use a quotient of the number of the times of random access in which the number of times of sending a preamble is 1 by the sum of quantities of times of random access as the first random access probability.

With reference to the first aspect or the first possible implementation manner of the first aspect, in a second possible implementation manner of the first aspect, the control parameter adjustment unit is configured to: when the first random access probability>a maximum probability of successful random access in which the number of times of sending a preamble is 1, and a current preamble-initial-received-target-power>(a preamble-initial-received-target-power before a first adjustment−a maximum number of times of one-way adjustments for the preamble-initial-received-target-power*a step for adjusting the preamble-initial-received-target-power), an adjusted preamble-initial-received-target-power=the current preamble-initial-received-target-power−the step for adjusting the preamble-initial-received-target-power; or when the first random access probability<a minimum probability of successful random access in which the number of times of sending a preamble is 1, and a current preamble-initial-received-target-power<(a preamble-initial-received-target-power before a first adjustment+a maximum number of times of one-way adjustments for the preamble-initial-received-target-power*a step for adjusting the preamble-initial-received-target-power), an adjusted preamble-initial-received-target-power=the current preamble-initial-received-target-power+the step for adjusting the preamble-initial-received-target-power.

With reference to the first aspect or either of the first and second possible implementation manners of the first aspect, in a third possible implementation manner of the first aspect, the random access probability determining unit is further configured to determine a second random access probability according to the random access information including contention conflict indication indicating a non-contention conflict, where the second random access probability represents a probability of random access in which a number of times of retransmitting a preamble is 1 in all random access of retransmission; and the control parameter adjustment unit is further configured to adjust a second random access power control parameter according to the second random access probability, where the second random access power control parameter is a power ramping step.

With reference to the third possible implementation manner of the first aspect, in a fourth possible implementation manner of the first aspect, the random access information statistics collecting unit is configured to: collect statistics on the random access information including contention conflict indication indicating a non-contention conflict, and obtain a number of times of random access in which the number of times of retransmitting a preamble is 1; and collect statistics on the random access information including contention conflict indication indicating a non-contention conflict, and obtain a sum of quantities of times of all random access of retransmission. The random access probability determining unit is configured to use a quotient of the number of the times of random access in which the number of times of retransmitting a preamble is 1 by the sum of quantities of times of all random access of retransmission as the second random access probability.

With reference to the third or fourth possible implementation manner of the first aspect, in a fifth possible implementation manner of the first aspect, the control parameter adjustment unit is configured to: when the second random access probability>a maximum probability of successful random access in which the number of times of retransmitting a preamble is 1, and a current power ramping step>2, an adjusted power ramping step=the current power ramping step−2; or when the second random access probability<a minimum probability of successful random access in which the number of times of retransmitting a preamble is 1, and a current power ramping step<6, an adjusted power ramping step=the current power ramping step+2.

With reference to the first aspect or either of the first and second possible implementation manners of the first aspect, in a sixth possible implementation manner of the first aspect, the random access probability determining unit is further configured to determine a preamble retransmission random access delay according to the random access information including contention conflict indication indicating a non-contention conflict; and the control parameter adjustment unit is further configured to adjust a second random access power control parameter according to the preamble retransmission random access delay, where the second random access power control parameter is a power ramping step.

With reference to the sixth possible implementation manner of the first aspect, in a seventh possible implementation manner of the first aspect, the preamble retransmission random access delay is $$\sum_{i=2}^{Maximum\ quantity\ of\ times\ of\ sending\ a\ preamble} k(i)*AP(i)/(1-AP(1)),$$

where AP(1) represents the first random access probability, AP(i) represents a probability of random access in which the number of times of sending a preamble is i, and k(i) represents a delay of random access in which the number of times of sending a preamble is i.

With reference to the sixth or seventh possible implementation manner of the first aspect, in an eighth possible implementation manner of the first aspect, the control parameter adjustment unit is configured to: when the preamble retransmission random access delay<a minimum value of an average preamble retransmission random access delay, and a current power ramping step>2, an adjusted power ramping step=the current power ramping step−2; or when the preamble retransmission random access delay>a maximum value of an average preamble retransmission random access delay, and a current power ramping step<6, an adjusted power ramping step=the current power ramping step+2.

With reference to the first aspect or any one of the first to eighth possible implementation manners of the first aspect, in a ninth possible implementation manner of the first aspect, the random access information obtaining unit is configured to: send a request message for obtaining random access information to the multiple UEs; and receive the random access information reported by the multiple UEs.

According to a second aspect, an embodiment of the present invention provides an apparatus for adjusting a random access power control parameter, including: a transceiver, configured to obtain random access information reported by multiple user equipment (UEs), where the random access information includes a contention conflict indication and a number of times of sending a preamble; a memory, configured to store the random access information reported by the multiple UEs; and a processor, configured to:

collect statistics on the random access information including contention conflict indication indicating a non-contention conflict; determine a first random access probability according to the random access information including contention conflict indication indicating a non-contention conflict, where the first random access probability represents a probability of random access in which the number of times of sending a preamble is 1; and adjust a first random access power control parameter according to the first random access probability, where the first random access power control parameter is a preamble-initial-received-target-power.

With reference to the second aspect, in a first possible implementation manner, when collecting statistics on the random access information including contention conflict indication indicating a non-contention conflict, the processor is configured to: collect statistics on the random access information including contention conflict indication indicating a non-contention conflict, and obtain a number of times of random access in which the number of times of sending a preamble is 1; and collect statistics on the random access information including contention conflict indication indicating a non-contention conflict, and obtain a sum of a number of times of random access; and when determining the first random access probability according to the random access information including contention conflict indication indicating a non-contention conflict, the processor is configured to: use a quotient of the number of the times of random access in which the number of times of sending a preamble is 1 by the sum of quantities of times of random access as the first random access probability.

With reference to the second aspect or the first possible implementation manner of the second aspect, in a second possible implementation manner of the second aspect, when adjusting the first random access power control parameter according to the first random access probability, the processor is configured to: when the first random access probability>a maximum probability of successful random access in which the number of times of sending a preamble is 1, and a current preamble-initial-received-target-power>(a preamble-initial-received-target-power before a first adjustment−a maximum number of times of one-way adjustments for the preamble-initial-received-target-power*a step for adjusting the preamble-initial-received-target-power), an adjusted preamble-initial-received-target-power=the current preamble-initial-received-target-power−the step for adjusting the preamble-initial-received-target-power; or when the first random access probability<a minimum probability of successful random access in which the number of times of sending a preamble is 1, and a current preamble-initial-received-target-power<(a preamble-initial-received-target-power before a first adjustment+a maximum number of times of one-way adjustments for the preamble-initial-received-target-power*a step for adjusting the preamble-initial-received-target-power), an adjusted preamble-initial-received-target-power=the current preamble-initial-received-target-power+the step for adjusting the preamble-initial-received-target-power.

With reference to the second aspect or either of the first and second possible implementation manners of the second aspect, in a third possible implementation manner of the second aspect, the processor is further configured to: determine a second random access probability according to the random access information including contention conflict indication indicating a non-contention conflict, where the second random access probability represents a probability of random access in which a number of times of retransmitting a preamble is 1 in all random access of retransmission; and adjust a second random access power control parameter according to the second random access probability, where the second random access power control parameter is a power ramping step.

With reference to the third possible implementation manner of the second aspect, in a fourth possible implementation manner of the second aspect, when collecting statistics on the random access information including contention conflict indication indicating a non-contention conflict, the processor is configured to: collect statistics on the random access information including contention conflict indication indicating a non-contention conflict, and obtain a number of times of random access in which the number of times of retransmitting a preamble is 1; and collect statistics on the random access information including contention conflict indication indicating a non-contention conflict, and obtain a sum of quantities of times of all random access of retransmission; and when determining the second random access probability according to the random access information including contention conflict indication indicating a non-contention conflict, the processor is configured to: use a quotient of the number of the times of random access in which the number of times of retransmitting a preamble is 1 by the sum of quantities of times of all random access of retransmission as the second random access probability.

With reference to the third or fourth possible implementation manner of the second aspect, in a fifth possible implementation manner of the second aspect, when adjusting the second random access power control parameter according to the second random access probability, the processor is configured to: when the second random access probability>a maximum probability of successful random access in which the number of times of retransmitting a preamble is 1, and a current power ramping step>2, an adjusted power ramping step=the current power ramping step−2; or when the second random access probability<a minimum probability of successful random access in which the number of times of retransmitting a preamble is 1, and a current power ramping step<6, an adjusted power ramping step=the current power ramping step+2.

With reference to the second aspect or either of the first and second possible implementation manners of the second aspect, in a sixth possible implementation manner of the second aspect, the processor is further configured to: determine a preamble retransmission random access delay according to the random access information including contention conflict indication indicating a non-contention conflict; and adjust a second random access power control parameter according to the preamble retransmission random access delay, where the second random access power control parameter is a power ramping step.

With reference to the sixth possible implementation manner of the second aspect, in a seventh possible implementation manner of the second aspect, the preamble retransmission random access delay is $$\sum_{i=2}^{\text{Maximum quantity of times of sending a preamble}} k(i)*AP(i)/(1-AP(1)),$$

where AP(1) represents the first random access probability, AP(i) represents a probability of random access in which the number of times of sending a preamble is i, and k(i)

represents a delay of random access in which the number of times of sending a preamble is i.

With reference to the sixth or seventh possible implementation manner of the second aspect, in an eighth possible implementation manner of the second aspect, when adjusting the second random access power control parameter according to the preamble retransmission random access delay, the processor is configured to: when the preamble retransmission random access delay<a minimum value of an average preamble retransmission random access delay, and a current power ramping step>2, an adjusted power ramping step=the current power ramping step−2; or when the preamble retransmission random access delay>a maximum value of an average preamble retransmission random access delay, and a current power ramping step<6, an adjusted power ramping step=the current power ramping step+2.

With reference to the second aspect or any one of the first to eighth possible implementation manners of the second aspect, in a ninth possible implementation manner of the second aspect, the transceiver is configured to: send a request message for obtaining random access information to the multiple UEs; and receive the random access information reported by the multiple UEs.

According to a third aspect, an embodiment of the present invention provides a method for adjusting a random access power control parameter, including: obtaining, by a base station, random access information reported by multiple user equipment (UEs), where the random access information includes a contention conflict indication and a number of times of sending a preamble; collecting, by the base station, statistics on the random access information including contention conflict indication indicating a non-contention conflict; determining, by the base station, a first random access probability according to the random access information including contention conflict indication indicating a non-contention conflict, where the first random access probability represents a probability of random access in which the number of times of sending a preamble is 1; and adjusting, by the base station, a first random access power control parameter according to the first random access probability, where the first random access power control parameter is a preamble-initial-received-target-power.

With reference to the third aspect, in a first possible implementation manner, the collecting, by the base station, statistics on the random access information including contention conflict indication indicating a non-contention conflict includes: collecting statistics on the random access information including contention conflict indication indicating a non-contention conflict, and obtaining a number of times of random access in which the number of times of sending a preamble is 1; and collecting statistics on the random access information including contention conflict indication indicating a non-contention conflict, and obtaining a sum of a number of times of random access; and the determining, by the base station, a first random access probability according to the random access information including contention conflict indication indicating a non-contention conflict includes: using a quotient of the number of the times of random access in which the number of times of sending a preamble is 1 by the sum of quantities of times of random access as the first random access probability.

With reference to the third aspect or the first possible implementation manner of the third aspect, in a second possible implementation manner of the third aspect, the adjusting, by the base station, a first random access power control parameter according to the first random access probability includes: when the first random access probability>a maximum probability of successful random access in which the number of times of sending a preamble is 1, and a current preamble-initial-received-target-power>(a preamble-initial-received-target-power before a first adjustment−a maximum number of times of one-way adjustments for the preamble-initial-received-target-power*a step for adjusting the preamble-initial-received-target-power), an adjusted preamble-initial-received-target-power=the current preamble-initial-received-target-power−the step for adjusting the preamble-initial-received-target-power; or when the first random access probability<a minimum probability of successful random access in which the number of times of sending a preamble is 1, and a current preamble-initial-received-target-power<(a preamble-initial-received-target-power before a first adjustment+a maximum number of times of one-way adjustments for the preamble-initial-received-target-power*a step for adjusting the preamble-initial-received-target-power), an adjusted preamble-initial-received-target-power=the current preamble-initial-received-target-power+the step for adjusting the preamble-initial-received-target-power.

With reference to the third aspect or either of the first and second possible implementation manners of the third aspect, in a third possible implementation manner of the third aspect, the method further includes: determining, by the base station, a second random access probability according to the random access information including contention conflict indication indicating a non-contention conflict, where the second random access probability represents a probability of random access in which a number of times of retransmitting a preamble is 1 in all random access of retransmission; and adjusting, by the base station, a second random access power control parameter according to the second random access probability, where the second random access power control parameter is a power ramping step.

With reference to the third possible implementation manner of the third aspect, in a fourth possible implementation manner of the third aspect, the collecting, by the base station, statistics on the random access information including contention conflict indication indicating a non-contention conflict includes: collecting statistics on the random access information including contention conflict indication indicating a non-contention conflict, and obtaining a number of times of random access in which the number of times of retransmitting a preamble is 1; and collecting statistics on the random access information including contention conflict indication indicating a non-contention conflict, and obtaining a sum of quantities of times of all random access of retransmission; and the determining, by the base station, a second random access probability according to the random access information including contention conflict indication indicating a non-contention conflict includes: using a quotient of the number of the times of random access in which the number of times of retransmitting a preamble is 1 by the sum of quantities of times of all random access of retransmission as the second random access probability.

With reference to the third or fourth possible implementation manner of the third aspect, in a fifth possible implementation manner of the third aspect, the adjusting, by the base station, a second random access power control parameter according to the second random access probability includes: when the second random access probability>a maximum probability of successful random access in which the number of times of retransmitting a preamble is 1, and a current power ramping step>2, an adjusted power ramping step=the current power ramping step−2; or when the second random access probability<a minimum probability of successful random access in which the number of times of retransmitting a preamble is 1, and a current power ramping step<6, an adjusted power ramping step=the current power ramping step+2.

With reference to the third aspect or either of the first and second possible implementation manners of the third aspect, in a sixth possible implementation manner of the third aspect, the method further includes: determining, by the base station, a preamble retransmission random access delay according to the random access information including contention conflict indication indicating a non-contention conflict; and adjusting, by the base station, a second random access power control parameter according to the preamble retransmission random access delay, where the second random access power control parameter is a power ramping step.

With reference to the sixth possible implementation manner of the third aspect, in a seventh possible implementation manner of the third aspect, the preamble retransmission random access delay is $$\sum_{i=2}^{\text{Maximum quantity of times of sending a preamble}} k(i)*AP(i)/(1-AP(1)),$$

where AP(1) represents the first random access probability, AP(i) represents a probability of random access in which the number of times of sending a preamble is i, and k(i) represents a delay of random access in which the number of times of sending a preamble is i.

With reference to the sixth or seventh possible implementation manner of the third aspect, in an eighth possible implementation manner of the third aspect, the adjusting, by the base station, a second random access power control parameter according to the preamble retransmission random access delay includes: when the preamble retransmission random access delay<a minimum value of an average preamble retransmission random access delay, and a current power ramping step>2, an adjusted power ramping step=the current power ramping step−2; or when the preamble retransmission random access delay>a maximum value of an average preamble retransmission random access delay, and a current power ramping step<6, an adjusted power ramping step=the current power ramping step+2.

With reference to the third aspect or any one of the first to eighth possible implementation manners of the third aspect, in a ninth possible implementation manner of the third aspect, the obtaining, by a base station, random access information reported by multiple user equipment UEs includes: sending, by the base station, a request message for obtaining random access information to the multiple UEs; and receiving, by the base station, the random access information reported by the multiple UEs.

In the embodiments of the present invention, a base station obtains random access information reported by multiple user equipment UEs, where the random access information includes a contention conflict indication and a number of times of sending a preamble; the base station collects statistics on the random access information including contention conflict indication indicating a non-contention conflict; the base station determines a first random access probability according to the random access information including contention conflict indication indicating a non-contention conflict, where the first random access probability represents a probability of random access in which the number of times of sending a preamble is 1; and the base station adjusts a first random access power control parameter according to the first random access probability, where the first random access power control parameter is a preamble-initial-received-target-power, so that a random access power control parameter can be adaptively adjusted, UE can calculate a transmit power for a random access preamble according to an adjusted random access power control parameter, and further a delay of the UE in a random access process is controlled to be within an expected range.

DESCRIPTION OF EMBODIMENTS

Embodiments of the present invention provide an apparatus and a method for adjusting a random access power control parameter, which can adaptively adjust a power control parameter and further control a delay of UE in a random access process to be within an expected range.

Figure 1:
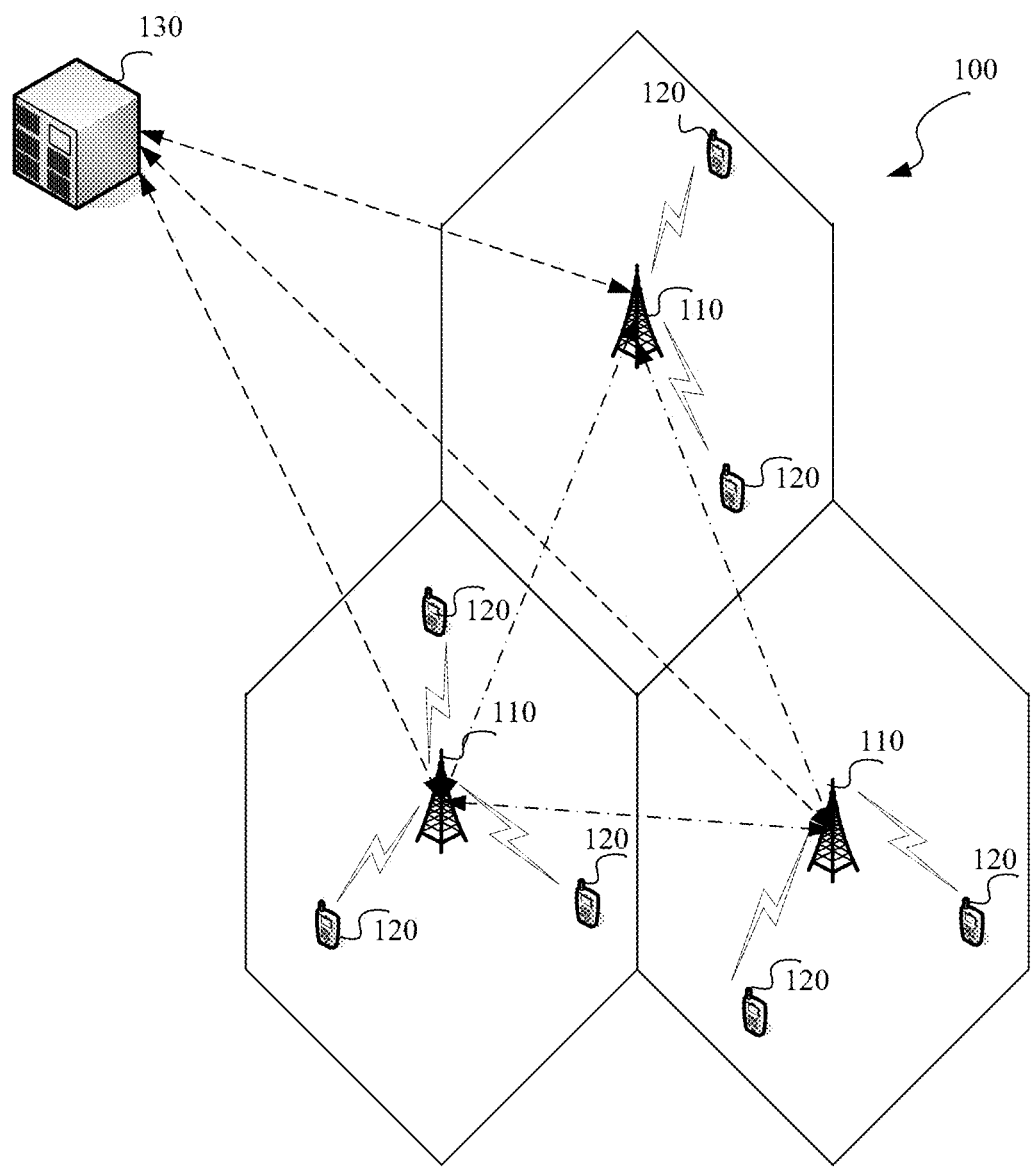
FIG. 1 is a schematic architectural diagram of an LTE communications system.

The embodiments of the present invention are applicable to a Long Term Evolution (LTE) communications system. As shown in FIG. 1, in a schematic architectural diagram of the LTE communications system, a wireless communications network 100 includes several base stations 110 and another network entity, to support several user equipment (UE) 120 to perform communication.

The base station 110 may be an evolved NodeB eNB) in LTE. One base station 110 may support or manage one or more cells. When the UE 120 needs to communicate with a network, the UE 120 initiates access by selecting one cell supported or managed by the base station 110.

The UE 120 may also be referred to as a mobile terminal (MT), a mobile station (MS), or the like, and can communicate with one or more core networks by using a radio access network (RAN).

A core network device 130 is connected to one or more base stations 110. The core network device 130 consists of a mobility management entity (MME) and/or another network entity.

Embodiment 1

Figure 2:
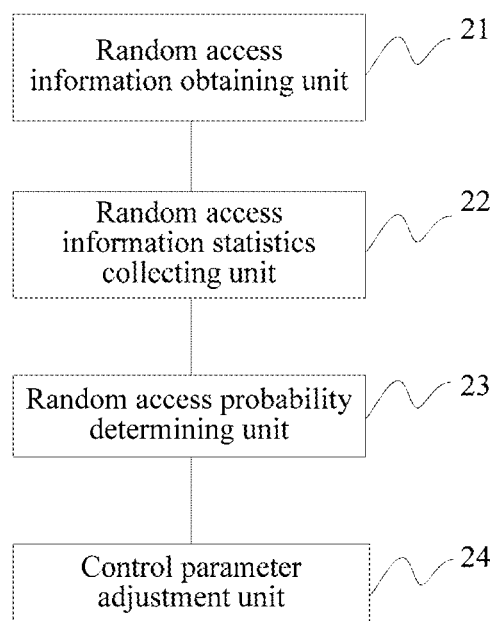
FIG. 2 is a schematic structural diagram of an apparatus for adjusting a random access power control parameter according to an embodiment of the present invention.

As shown in FIG. 2, this embodiment of the present invention provides an apparatus for adjusting a random access power control parameter, including: a random access information obtaining unit 21, configured to obtain random access information reported by multiple user equipment (UEs), where the random access information includes a contention conflict indication and a number of times of sending a preamble; a random access information statistics collecting unit 22, configured to collect statistics on the random access information including contention conflict indication indicating a non-contention conflict; a random access probability determining unit 23, configured to determine a first random access probability according to the random access information including contention conflict indication indicating a non-contention conflict, where the first random access probability represents a probability of random access in which the number of times of sending a preamble is 1; and a control parameter adjustment unit 24, configured to adjust a first random access power control parameter according to the first random access probability, where the first random access power control parameter is a preamble-initial-received-target-power. Preferably, the random access information statistics collecting unit 22 is configured to: collect statistics on the random access information including contention conflict indication indicating a non-contention conflict, and obtain a number of times of random access in which the number of times of sending a preamble is 1; and collect statistics on the random access information including contention conflict indication indicating a non-contention conflict, and obtain a sum of a number of times of random access. The random access probability determining unit 23 is configured to: use a quotient of the number of the times of random access in which the number of times of sending a preamble is 1 by the sum of quantities of times of random access as the first random access probability.

Preferably, the control parameter adjustment unit 24 is configured to: when the first random access probability>a maximum probability of successful random access in which the number of times of sending a preamble is 1, and a current preamble-initial-received-target-power>a preamble-initial-received-target-power before a first adjustment−a maximum number of times of one-way adjustments for the preamble-initial-received-target-power*a step for adjusting the preamble-initial-received-target-power, an adjusted preamble-initial-received-target-power=the current preamble-initial-received-target-power−the step for adjusting the preamble-initial-received-target-power; or when the first random access probability<a minimum probability of successful random access in which the number of times of sending a preamble is 1, and a current preamble-initial-received-target-power<a preamble-initial-received-target-power before a first adjustment+a maximum number of times of one-way adjustments for the preamble-initial-received-target-power*a step for adjusting the preamble-initial-received-target-power, an adjusted preamble-initial-received-target-power=the current preamble-initial-received-target-power+the step for adjusting the preamble-initial-received-target-power.

Preferably, the random access probability determining unit 23 is further configured to determine a second random access probability according to the random access information including contention conflict indication indicating a non-contention conflict, where the second random access probability represents a probability of random access in which a number of times of retransmitting a preamble is 1 in all random access of retransmission; and the control parameter adjustment unit 24 is further configured to adjust a second random access power control parameter according to the second random access probability, where the second random access power control parameter is a power ramping step.

Preferably, the random access information statistics collecting unit 22 is configured to: collect statistics on the random access information including contention conflict indication indicating a non-contention conflict, and obtain a number of times of random access in which the number of times of retransmitting a preamble is 1; and collect statistics on the random access information including contention conflict indication indicating a non-contention conflict, and obtain a sum of quantities of times of all random access of retransmission. The random access probability determining unit 23 is configured to: use a quotient of the number of the times of random access in which the number of times of retransmitting a preamble is 1 by the sum of quantities of times of all random access of retransmission as the second random access probability.

Preferably, the control parameter adjustment unit 24 is configured to: when the second random access probability>a maximum probability of successful random access in which the number of times of retransmitting a preamble is 1, and a current power ramping step>2, an adjusted power ramping step=the current power ramping step−2; or when the second random access probability<a minimum probability of successful random access in which the number of times of retransmitting a preamble is 1, and a current power ramping step<6, an adjusted power ramping step=the current power ramping step+2.

Preferably, the random access probability determining unit 23 is further configured to determine a preamble retransmission random access delay according to the random access information including contention conflict indication indicating a non-contention conflict; and the control parameter adjustment unit 24 is further configured to adjust a second random access power control parameter according to the preamble retransmission random access delay, where the second random access power control parameter is a power ramping step.

Preferably, the preamble retransmission random access delay is $$\sum_{i=2}^{\text{Maximum quantity of times of sending a preamble}} k(i) * AP(i)/(1 - AP(1)),$$

where AP(1) represents the first random access probability, AP(i) represents a probability of random access in which the number of times of sending a preamble is i, and k(i) represents a delay of random access in which the number of times of sending a preamble is i.

Preferably, the control parameter adjustment unit 24 is configured to: when the preamble retransmission random access delay<a minimum value of an average preamble retransmission random access delay, and a current power ramping step>2, an adjusted power ramping step=the current power ramping step−2; or when the preamble retransmission random access delay>a maximum value of an average preamble retransmission random access delay, and a current power ramping step<6, an adjusted power ramping step=the current power ramping step+2.

Preferably, the random access information obtaining unit 21 is configured to: send a request message for obtaining random access information to the multiple UEs; and receive the random access information reported by the multiple UEs.

By means of Embodiment 1, a random access power control parameter can be adaptively adjusted, UE can calculate a transmit power for a random access preamble according to an adjusted random access power control parameter, and a delay of the UE in a random access process is controlled to be within an expected range.

Embodiment 2

Figure 3:
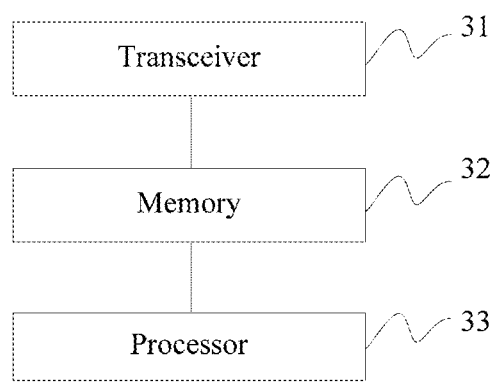
FIG. 3 is a schematic structural diagram of an apparatus for adjusting a random access power control parameter according to an embodiment of the present invention.

As shown in FIG. 3, this embodiment of the present invention provides an apparatus for adjusting a random access power control parameter, including: a transceiver 31, configured to obtain random access information reported by multiple user equipment (UEs), where the random access information includes a contention conflict indication and a number of times of sending a preamble; a memory 32, configured to store the random access information reported by the multiple (UEs); and a processor 33, configured to collect statistics on the random access information including contention conflict indication indicating a non-contention conflict; determine a first random access probability according to the random access information including contention conflict indication indicating a non-contention conflict, where the first random access probability represents a probability of random access in which the number of times of sending a preamble is 1; and adjust a first random access power control parameter according to the first random access probability, where the first random access power control parameter is a preamble-initial-received-target-power.

Preferably, when collecting statistics on the random access information including contention conflict indication indicating a non-contention conflict, the processor 33 is configured to: collect statistics on the random access information including contention conflict indication indicating a non-contention conflict, and obtain a number of times of random access in which the number of times of sending a preamble is 1; and collect statistics on the random access information including contention conflict indication indicating a non-contention conflict, and obtain a sum of a number of times of random access; and when determining the first random access probability according to the random access information including contention conflict indication indicating a non-contention conflict, the processor 33 is configured to: use a quotient of the number of the times of random access in which the number of times of sending a preamble is 1 by the sum of quantities of times of random access as the first random access probability.

Preferably, when adjusting the first random access power control parameter according to the first random access probability, the processor 33 is configured to: when the first random access probability>a maximum probability of successful random access in which the number of times of sending a preamble is 1, and a current preamble-initial-received-target-power>a preamble-initial-received-target-power before a first adjustment−a maximum number of times of one-way adjustments for the preamble-initial-received-target-power*a step for adjusting the preamble-initial-received-target-power, an adjusted preamble-initial-received-target-power=the current preamble-initial-received-target-power−the step for adjusting the preamble-initial-received-target-power; or when the first random access probability<a minimum probability of successful random access in which the number of times of sending a preamble is 1, and a current preamble-initial-received-target-power<a preamble-initial-received-target-power before a first adjustment+a maximum number of times of one-way adjustments for the preamble-initial-received-target-power*a step for adjusting the preamble-initial-received-target-power, an adjusted preamble-initial-received-target-power=the current preamble-initial-received-target-power+the step for adjusting the preamble-initial-received-target-power.

Preferably, the processor 33 is further configured to: determine a second random access probability according to the random access information including contention conflict indication indicating a non-contention conflict, where the second random access probability represents a probability of random access in which a number of times of retransmitting a preamble is 1 in all random access of retransmission; and adjust a second random access power control parameter according to the second random access probability, where the second random access power control parameter is a power ramping step.

Preferably, when collecting statistics on the random access information including contention conflict indication indicating a non-contention conflict, the processor 33 is configured to: collect statistics on the random access information including contention conflict indication indicating a non-contention conflict, and obtain a number of times of random access in which the number of times of retransmitting a preamble is 1; and collect statistics on the random access information including contention conflict indication indicating a non-contention conflict, and obtain a sum of quantities of times of all random access of retransmission; and when determining the second random access probability according to the random access information including contention conflict indication indicating a non-contention conflict, the processor 33 is configured to: use a quotient of the number of the times of random access in which the number of times of retransmitting a preamble is 1 by the sum of quantities of times of all random access of retransmission as the second random access probability.

Preferably, when adjusting the second random access power control parameter according to the second random access probability, the processor 33 is configured to: when the second random access probability>a maximum probability of successful random access in which the number of times of retransmitting a preamble is 1, and a current power ramping step>2, an adjusted power ramping step=the current power ramping step−2; or when the second random access probability<a minimum probability of successful random access in which the number of times of retransmitting a preamble is 1, and a current power ramping step<6, an adjusted power ramping step=the current power ramping step+2. Preferably, the processor 33 is further configured to: determine a preamble retransmission random access delay according to the random access information including contention conflict indication indicating a non-contention conflict; and adjust a second random access power control parameter according to the preamble retransmission random access delay, where the second random access power control parameter is a power ramping step.

Preferably, the preamble retransmission random access delay is $$\sum_{i=2}^{\text{Maximum quantity of times of sending a preamble}} k(i)*AP(i)/(1-AP(1)),$$

where AP(1) represents the first random access probability, AP(i) represents a probability of random access in which the number of times of sending a preamble is i, and k(i) represents a delay of random access in which the number of times of sending a preamble is i.

Preferably, when adjusting the second random access power control parameter according to the preamble retransmission random access delay, the processor 33 is configured to: when the preamble retransmission random access delay<a minimum value of an average preamble retransmission random access delay, and a current power ramping step>2, an adjusted power ramping step=the current power ramping step−2; or when the preamble retransmission random access delay>a maximum value of an average preamble retransmission random access delay, and a current power ramping step<6, an adjusted power ramping step=the current power ramping step+2.

Preferably, the transceiver 31 is configured to: send a request message for obtaining random access information to the multiple UEs; and receive the random access information reported by the multiple UEs. By means of the transceiver, the memory, and the processor in Embodiment 2, a random access power control parameter can be adaptively adjusted, UE can calculate a transmit power for a random access preamble according to an adjusted random access power control parameter, and a delay of the UE in a random access process is controlled to be within an expected range.

Embodiment 3

Figure 4:
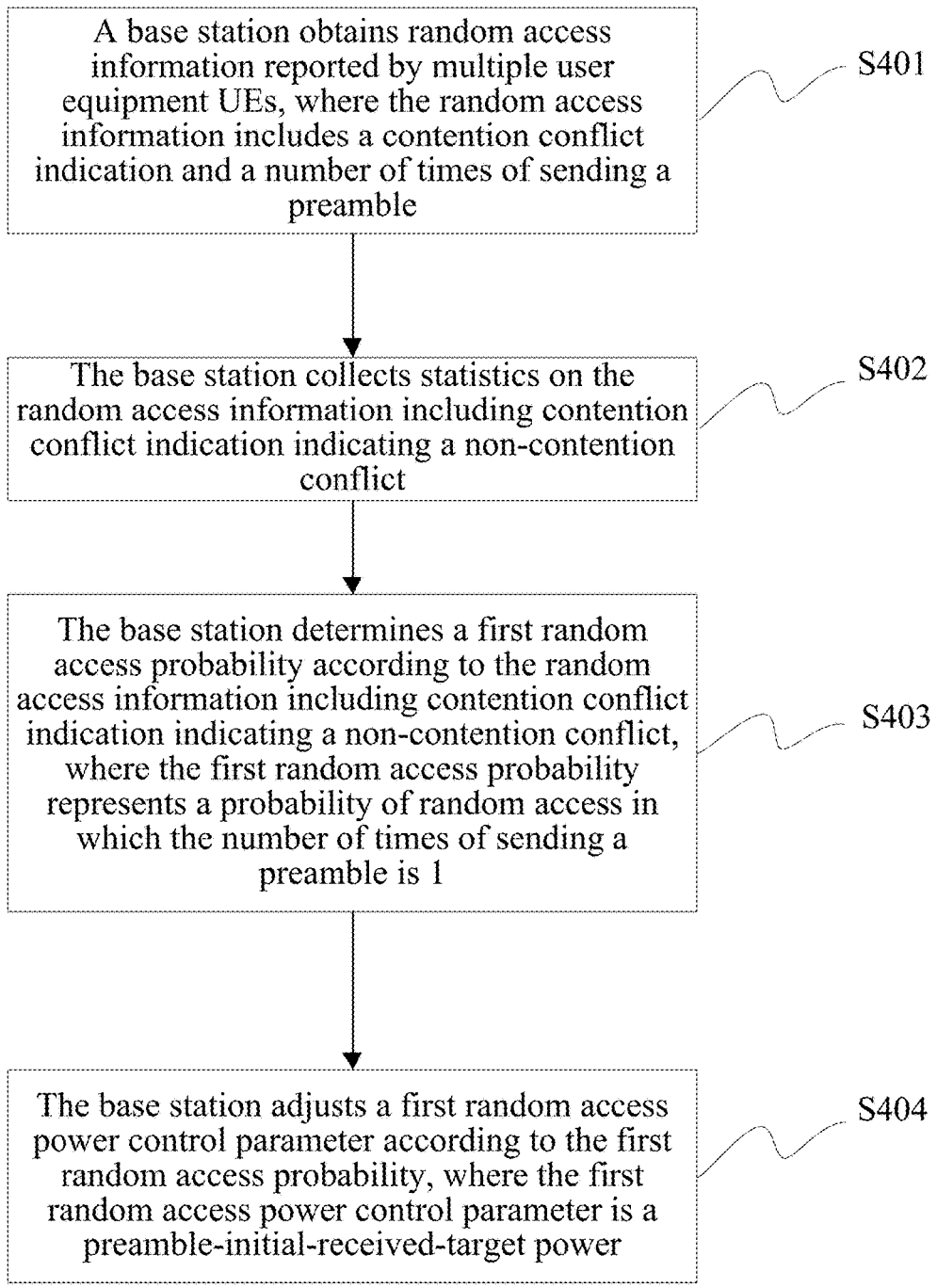
FIG. 4 is a schematic flowchart of a method for adjusting a random access power control parameter according to an embodiment of the present invention.

As shown in FIG. 4, this embodiment of the present invention provides a method for adjusting a random access power control parameter. The method includes:

S401: A base station obtains random access information reported by multiple user equipment (UEs), where the random access information includes a contention conflict indication and a number of times of sending a preamble.

Preferably, the method for obtaining, by a base station, random access information reported by multiple user equipment (UEs) includes: sending, by the base station, a request message for obtaining random access information to the multiple UEs; and receiving, by the base station, the random access information reported by the multiple UEs.

UE in the multiple UEs refers to any UE that completes random access and supports reporting of random access channel information. Contention conflict refers to contention conflict occurring when multiple UEs in a cell initiate random access on a same physical random access channel (PRACH) by using a same preamble. Whether UE supports reporting of random access channel information can be indicated by using a self-optimized and related parameter (son-Parameters-r9) in the cell r9 release protocol in UE capability information (IE UE-EUTRA-Capability).

S402: The base station collects statistics on the random access information including contention conflict indication indicating a non-contention conflict.

Preferably, the method for collecting, by the base station, statistics on the random access information including contention conflict indication indicating a non-contention conflict includes: collecting statistics on the random access information including contention conflict indication indicating a non-contention conflict, and obtaining a number of times of random access in which the number of times of sending a preamble is 1; and collecting statistics on the random access information including contention conflict indication indicating a non-contention conflict, and obtaining a sum of a number of times of random access.

Figure 5:
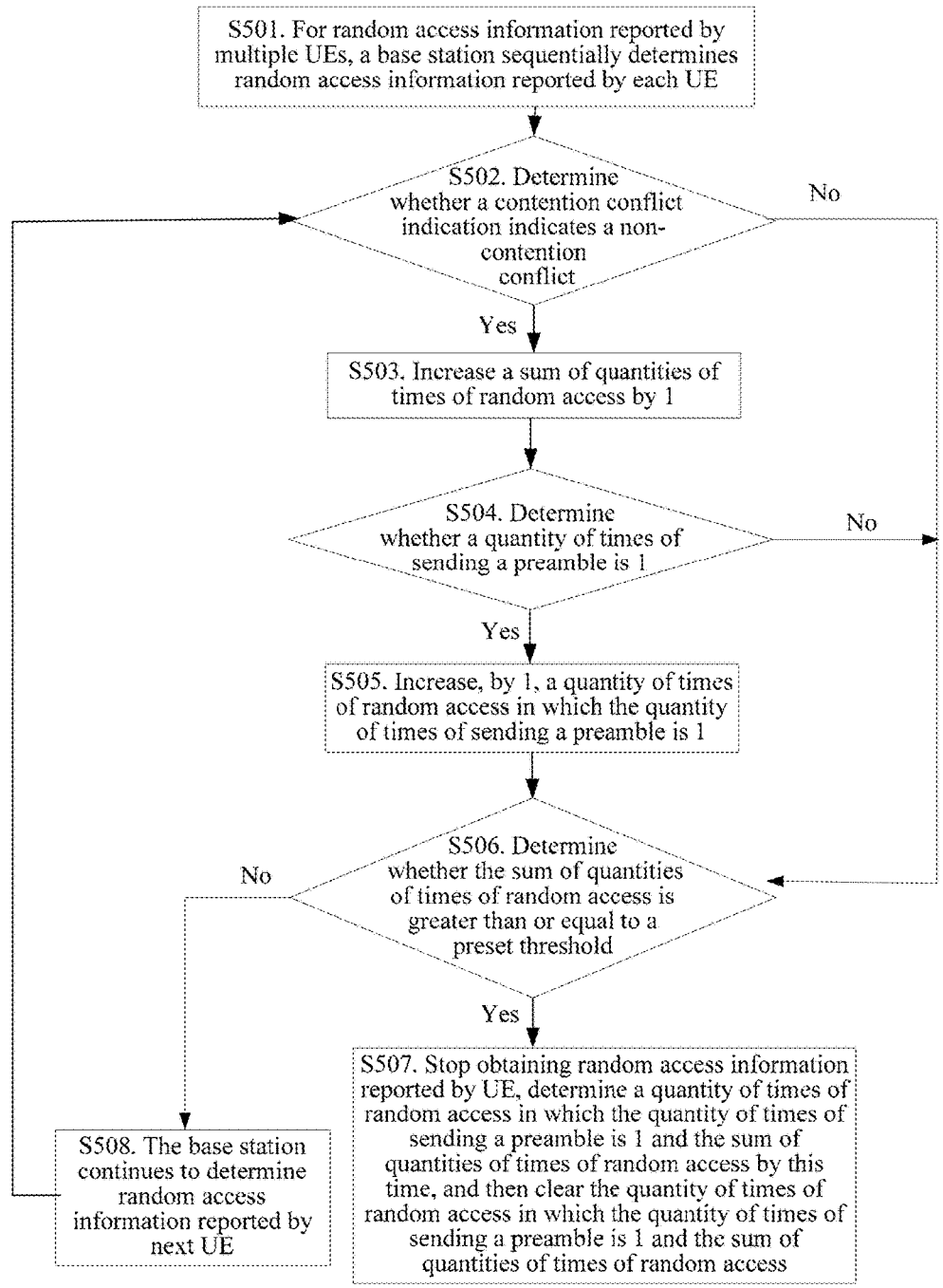
FIG. 5 is a schematic flowchart of a method for collecting, by a base station, statistics on random access information including contention conflict indication indicating a non-contention conflict according to an embodiment of the present invention.

Specifically, as shown in FIG. 5, the method for collecting, by the base station, statistics on the random access information including contention conflict indication indicating a non-contention conflict in S402 includes:

S501: For the random access information reported by the multiple UEs, the base station sequentially determines random access information reported by each UE.

That is, step S502 to step S506 need to be performed for the random access information reported by each UE.

S502: Determine whether a contention conflict indication indicates a non-contention conflict.

If yes, step S503 is performed; otherwise, step S506 is performed.

S503: Increase a sum of a number of times of random access by 1.

S504: Determine whether a number of times of sending a preamble is 1.

If yes, step S505 is performed; otherwise, step S506 is performed.

S505: Increase, by 1, a number of times of random access in which the number of times of sending a preamble is 1.

That the contention conflict indication indicates a non-contention conflict refers to that contention conflict of the UE is successfully resolved. Initial values of the number of times of random access in which the number of times of sending a preamble is 1 and the sum of quantities of times of random access both are 0.

S506: Determine whether the sum of quantities of times of random access is greater than or equal to a preset threshold.

The threshold is preset by the base station. For example, the threshold may be set to 1000.

If yes, step S507 is performed; otherwise, step S508 is performed.

S507: Stop obtaining random access information reported by UE, determine a number of times of random access in which the number of times of sending a preamble is 1 and the sum of quantities of times of random access by this time, and then clear the number of times of random access in which the number of times of sending a preamble is 1 and the sum of quantities of times of random access.

S508: The base station continues to determine random access information reported by next UE.

That is, step S502 to step S506 are performed for the random access information reported by the next UE, and until the sum of quantities of times of random access is greater than or equal to the preset threshold, a number of times of random access in which the number of times of sending a preamble is 1 and the sum of quantities of times of random access by this time are determined.

S403: The base station determines a first random access probability according to the random access information including contention conflict indication indicating a non-contention conflict, where the first random access probability represents a probability of random access in which the number of times of sending a preamble is 1.

Preferably, the method for determining, by the base station, a first random access probability according to the random access information including contention conflict indication indicating a non-contention conflict includes: using, by the base station, a quotient of the number of the times of random access in which the number of times of sending a preamble is 1 by the sum of quantities of times of random access as the first random access probability, where the number of times of sending a preamble is 1 and the sum of quantities of times of random access are obtained through statistics collection in step S402, that is, the first random access probability AP(1)=the number of times of random access in which the number of times of sending a preamble is 1/the sum of quantities of times of random access.

S404: The base station adjusts a first random access power control parameter according to the first random access probability, where the first random access power control parameter is a preamble-initial-received-target-power.

Figure 6:
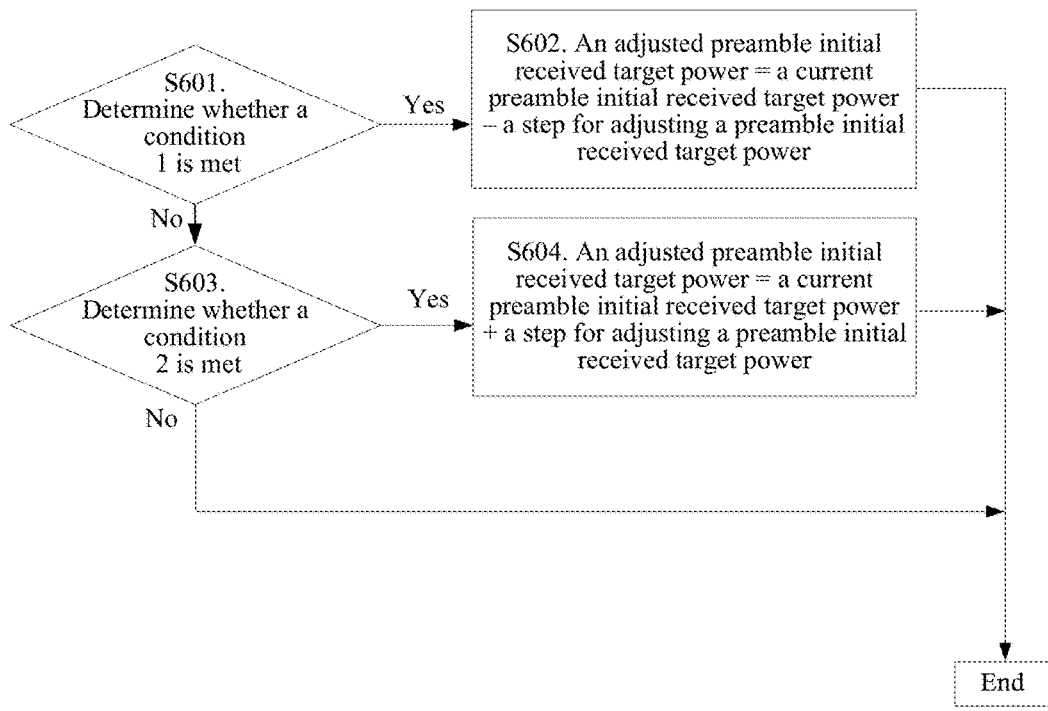
FIG. 6 is a schematic flowchart of a method for adjusting a random access power control parameter according to an embodiment of the present invention.

Preferably, as shown in FIG. 6, the method for adjusting, by the base station, a first random access power control parameter according to the first random access probability includes:

S601: Determine whether a condition 1 is met.

The condition 1 is: The first random access probability>a maximum probability of successful random access in which the number of times of sending a preamble is 1, and a current preamble-initial-received-target-power>a preamble-initial-received-target-power before a first adjustment−a maximum number of times of one-way adjustments for the preamble-initial-received-target-power*a step for adjusting the preamble-initial-received-target-power.

If the condition 1 is met, step S602 is performed; otherwise, step S603 is performed.

S602: An adjusted preamble-initial-received-target-power=a current preamble-initial-received-target-power−a step for adjusting a preamble-initial-received-target-power.

S603: Determine whether a condition 2 is met.

The condition 2 is: The first random access probability<a minimum probability of successful random access in which the number of times of sending a preamble is 1, and a current preamble-initial-received-target-power<a preamble-initial-received-target-power before a first adjustment+a maximum number of times of one-way adjustments for the preamble-initial-received-target-power*a step for adjusting the preamble-initial-received-target-power.

If the condition 2 is met, step S604 is performed.

S604: An adjusted preamble-initial-received-target-power=a current preamble-initial-received-target-power+a step for adjusting a preamble-initial-received-target-power.

The following parameters are preset by the base station, and suggested values for the parameters are shown in Table 2.

TABLE 2

| Parameter | Suggested value |
| --- | --- |
| Minimum probability of successful random access in which a number of times of sending a preamble is 1 | 85% |
| Maximum probability of successful random access in which a number of times of sending a preamble is 1 | 95% |
| Maximum number of times of one-way adjustments for a preamble-initial-received-target-power | 5 |
| Step for adjusting a preamble-initial-received-target-power | 2 dB |

Optionally, after step S404, the base station sends a system information block SIB message that carries the adjusted preamble-initial-received-target-power to the UE, so that the UE calculates a transmit power for a random access preamble according to the adjusted preamble-initial-received-target-power, and performs a subsequent process, for example, sends a preamble.

By means of Embodiment 3, a random access power control parameter (a preamble-initial-received-target-power) can be adaptively adjusted by a base station, UE can calculate a transmit power for a random access preamble according to an adjusted random access power control parameter, and a delay of the UE in a random access process is controlled to be within an expected range.

Embodiment 4

Figure 7:
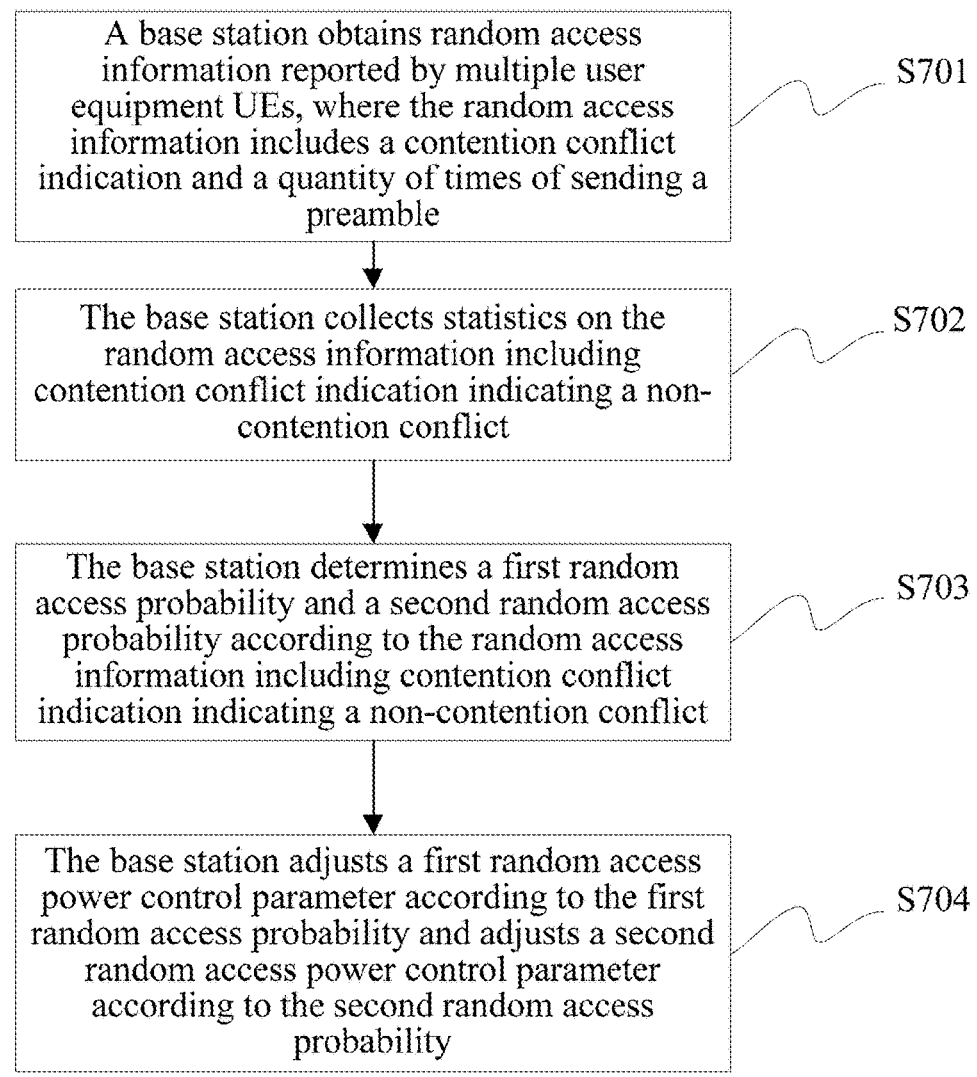
FIG. 7 is a schematic flowchart of a method for adjusting a random access power control parameter according to an embodiment of the present invention.

As shown in FIG. 7, this embodiment of the present invention provides a method for adjusting a random access power control parameter. The method includes:

S701: A base station obtains random access information reported by multiple user equipment (UEs), where the random access information includes a contention conflict indication and a number of times of sending a preamble.

Preferably, the method for obtaining, by a base station, random access information reported by multiple user equipment (UEs) includes: sending, by the base station, a request message for obtaining random access information to the multiple UEs; and receiving, by the base station, the random access information reported by the multiple UEs.

UE in the multiple UEs refers to any UE that completes random access and supports reporting of random access channel information.

S702: The base station collects statistics on the random access information including contention conflict indication indicating a non-contention conflict.

Preferably, the method for collecting, by the base station, statistics on the random access information including contention conflict indication indicating a non-contention conflict includes: collecting, by the base station, statistics on the random access information including contention conflict indication indicating a non-contention conflict, and obtaining a number of times of random access in which the number of times of sending a preamble is 1, a sum of a number of times of random access, a number of times of random access in which a number of times of retransmitting a preamble is 1, and a sum of quantities of times of all random access of retransmission.

Specifically, the method for collecting, by the base station, statistics on the random access information including contention conflict indication indicating a non-contention conflict, a number of times of random access in which the number of times of sending a preamble is 1, and the sum of quantities of times of random access in step S702 is the same as the method shown in FIG. 5, and details are not described herein again.

Figure 8:
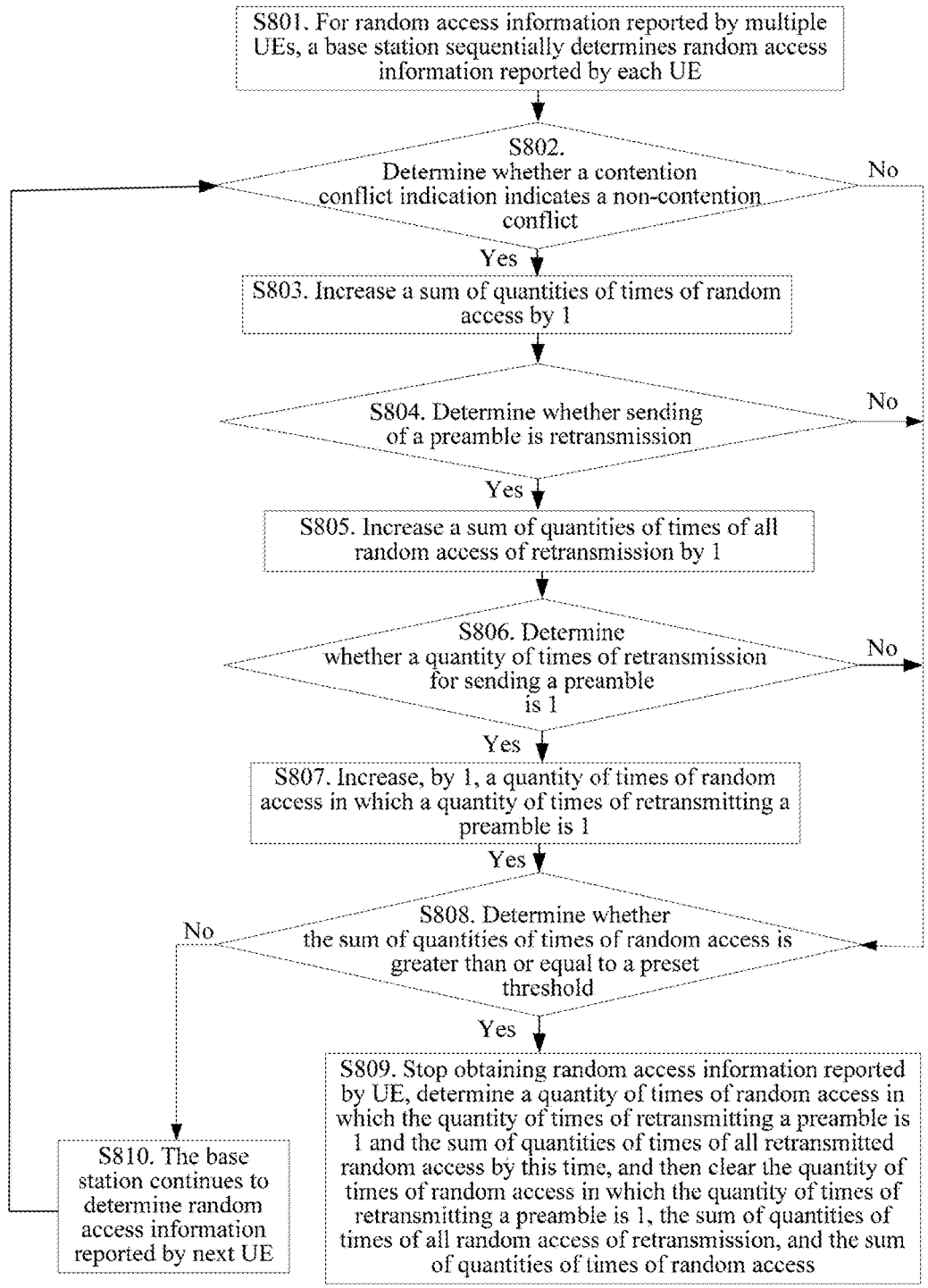
FIG. 8 is a schematic flowchart of a method for collecting, by a base station, statistics on random access information including contention conflict indication indicating a non-contention conflict according to an embodiment of the present invention.

As shown in FIG. 8, the method for collecting, by the base station, statistics on a number of times of random access in which a number of times of retransmitting a preamble is 1, and the sum of quantities of times of all random access of retransmission in step S702 includes:

S801: For the random access information reported by the multiple UEs, the base station sequentially determines random access information reported by each UE.

That is, step S802 to step S808 need to be performed for the random access information reported by each UE.

S802: Determine whether a contention conflict indication indicates a non-contention conflict.

If yes, step S803 is performed; otherwise, step S808 is performed.

S803: Increase a sum of a number of times of random access by 1.

S804: Determine whether a preamble is retransmitted.

If yes, step S805 is performed; otherwise, step S808 is performed.

S805: Increase the sum of quantities of times of all random access of retransmission by 1.

S806: Determine whether a number of times of retransmission for sending a preamble is 1.

If yes, step S807 is performed; otherwise, step S808 is performed.

S807: Increase, by 1, the number of times of random access in which the number of times of retransmitting a preamble is 1.

Initial values of the number of times of random access in which the number of times of retransmitting a preamble is 1, the sum of quantities of times of all random access of retransmission, and the sum of quantities of times of random access all are 0

S808: Determine whether the sum of quantities of times of random access is greater than or equal to a preset threshold.

The threshold is preset by the base station. For example, the threshold may be set to 1000.

If yes, step S809 is performed; otherwise, step S810 is performed.

S809: Stop obtaining random access information reported by UE, determine a number of times of random access in which the number of times of retransmitting a preamble is 1 and the sum of quantities of times of all random access of retransmission by this time, and then clear the number of times of random access in which the number of times of retransmitting a preamble is 1, the sum of quantities of times of all random access of retransmission, and the sum of quantities of times of random access.

S810: The base station continues to determine random access information reported by next UE.

That is, step S802 to step S808 are performed for the random access information reported by the next UE, and until the sum of quantities of times of random access is greater than or equal to the preset threshold, a number of times of random access in which the number of times of retransmitting a preamble is 1 and the sum of quantities of times of all random access of retransmission by this time are determined.

S703: The base station determines a first random access probability and a second random access probability according to the random access information including contention conflict indication indicating a non-contention conflict, where the first random access probability represents a probability of random access in which the number of times of sending a preamble is 1, and the second random access probability represents a probability of random access in which a number of times of retransmitting a preamble is 1 in all random access of retransmission.

Preferably, the method for determining, by the base station, a first random access probability and a second random access probability according to the random access information including contention conflict indication indicating a non-contention conflict includes: using a quotient of the number of the times of random access in which the number of times of sending a preamble is 1 by the sum of quantities of times of random access as the first random access probability AP(1), that is, the first random access probability AP(1)=the number of times of random access in which the number of times of sending a preamble is 1/the sum of quantities of times of random access; using a quotient of the number of the times of random access in which the number of times of retransmitting a preamble is 1 by the sum of quantities of times of all random access of retransmission as the second random access probability AP(2)/[1−AP(1)], that is, the second random access probability AP(2)/[1−AP(1)]=the number of times of random access in which the number of times of retransmitting a preamble is 1/the sum of quantities of times of all random access of retransmission; or first calculating a probability AP(1) of random access in which the number of times of sending a preamble is 1 and a probability AP(2) of random access in which the number of times of sending a preamble is 2, where AP(2)=a number of times of random access in which the number of times of sending a preamble is 2/the sum of quantities of times of random access, and then determining the second random access probability AP(2)/[1−AP(1)] according to AP(1) and AP(2).

S704: The base station adjusts a first random access power control parameter according to the first random access probability and adjusts a second random access power control parameter according to the second random access probability, where the first random access power control parameter is a preamble-initial-received-target-power, and the second random access power control parameter is a power ramping step.

Figure 9:
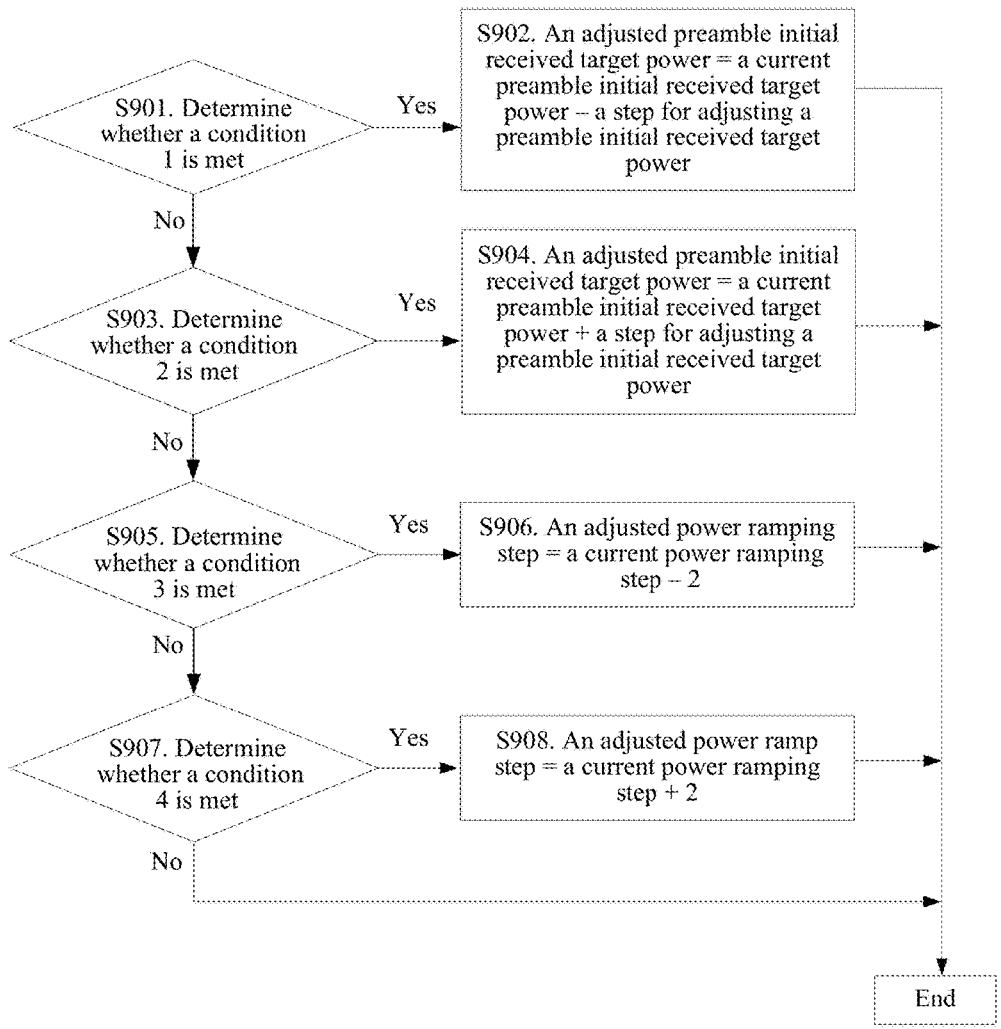
FIG. 9 is a schematic flowchart of a method for adjusting a random access power control parameter according to an embodiment of the present invention.

Preferably, as shown in FIG. 9, the method for adjusting, by the base station, a first random access power control parameter according to the first random access probability and adjusting, by the base station, a second random access power control parameter according to the second random access probability includes:

S901: Determine whether a condition 1 is met.

The condition 1 is: The first random access probability>a maximum probability of successful random access in which the number of times of sending a preamble is 1, and a current preamble-initial-received-target-power>a preamble-initial-received-target-power before a first adjustment−a maximum number of times of one-way adjustments for the preamble-initial-received-target-power*a step for adjusting the preamble-initial-received-target-power.

If the condition 1 is met, step S902 is performed; otherwise, step S903 is performed.

S902: An adjusted preamble-initial-received-target-power=a current preamble-initial-received-target-power−a step for adjusting a preamble-initial-received-target-power.

S903: Determine whether a condition 2 is met.

The condition 2 is: The first random access probability<a minimum probability of successful random access in which the number of times of sending a preamble is 1, and a current preamble-initial-received-target-power<a preamble-initial-received-target-power before a first adjustment+a maximum number of times of one-way adjustments for the preamble-initial-received-target-power*a step for adjusting the preamble-initial-received-target-power.

If the condition 2 is met, step S904 is performed; otherwise, step S905 is performed.

S904: An adjusted preamble-initial-received-target-power=a current preamble-initial-received-target-power+a step for adjusting a preamble-initial-received-target-power.

S905: Determine whether a condition 3 is met.

The condition 3 is: The second random access probability>a maximum probability of successful random access in which the number of times of retransmitting a preamble is 1, and a current power ramping step>2.

If the condition 3 is met, step S906 is performed; otherwise, step S907 is performed.

S906: An adjusted power ramping step=a current power ramping step−2.

S907: Determine whether a condition 4 is met.

The condition 4 is: The second random access probability<a minimum probability of successful random access in which the number of times of retransmitting a preamble is 1, and a current power ramping step<6.

If the condition 4 is met, step S908 is performed.

S908: An adjusted power ramping step=a current power ramping step+2.

The following parameters are preset by the base station, and suggested values for the parameters are shown in Table 3.

TABLE 3

| Parameter | Suggested value |
|---|---|
| Minimum probability of successful random access in which a number of times of sending a preamble is 1 | 85% |
| Maximum probability of successful random access in which a number of times of sending a preamble is 1 | 95% |
| Minimum probability of successful random access in which a number of times of retransmitting a preamble is 1 | 85% |
| Maximum probability of successful random access in which a number of times of retransmitting a preamble is 1 | 95% |
| Maximum number of times of one-way adjustments for a preamble-initial-received-target-power | 5 |
| Step for adjusting a preamble-initial-received-target-power | 2 dB |

Optionally, after step S704, the base station sends a system information block SIB message that carries the adjusted preamble-initial-received-target-power and the adjusted power ramping step to the UE, so that the UE calculates a transmit power for the random access preamble according to the adjusted preamble-initial-received-target-power and the adjusted power ramping step, and performs a subsequent process, for example, sends a preamble.

By means of Embodiment 4, random access power control parameters (a preamble-initial-received-target-power and a power ramping step) can be adaptively adjusted by a base station, UE can calculate a transmit power for a random access preamble according to adjusted random access power control parameters, and a delay of the UE in a random access process is controlled to be within an expected range.

Embodiment 5

Figure 10:
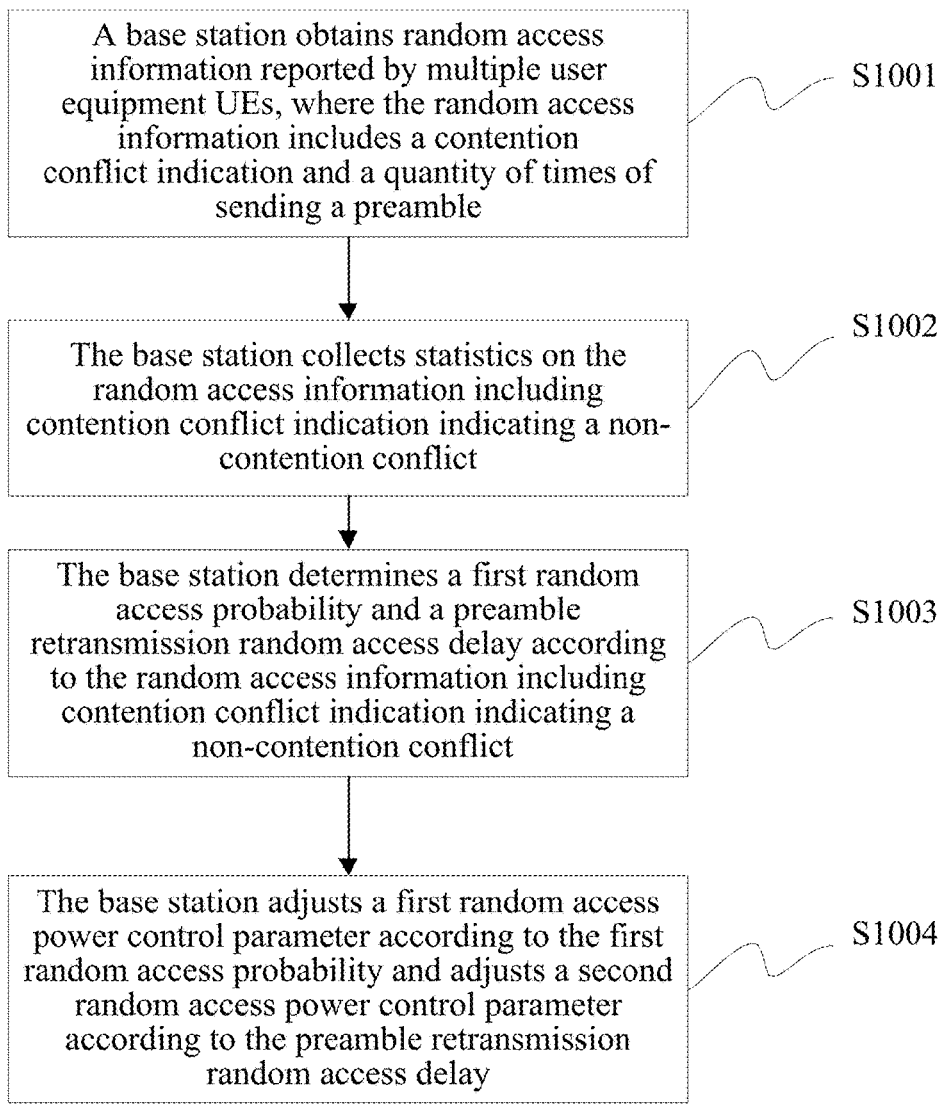
FIG. 10 is a schematic flowchart of a method for adjusting a random access power control parameter according to an embodiment of the present invention.

As shown in FIG. 10, this embodiment of the present invention provides a method for adjusting a random access power control parameter. The method includes:

S1001: A base station obtains random access information reported by multiple user equipment (UEs), where the random access information includes a contention conflict indication and a number of times of sending a preamble.

Preferably, the method for obtaining, by a base station, random access information reported by multiple user equipment (UEs) includes: sending, by the base station, a request message for obtaining random access information to the multiple UEs; and receiving, by the base station, the random access information reported by the multiple UEs.

S1002: The base station collects statistics on the random access information including contention conflict indication indicating a non-contention conflict.

Preferably, the method for collecting, by the base station, statistics on the random access information including contention conflict indication indicating a non-contention conflict includes:

collecting, by the base station, statistics on the random access information including contention conflict indication indicating a non-contention conflict, a number of times of random access in which the number of times of sending a preamble is 1, a sum of a number of times of random access, and a number of times of random access in which the number of times of sending a preamble is i, where i is a natural number whose value is greater than or equal to 2, and a maximum value of i is a maximum number of times of sending a preamble.

Specifically, the method for collecting, by the base station, statistics on the random access information including contention conflict indication indicating a non-contention conflict, a number of times of random access in which the number of times of sending a preamble is 1, and the sum of quantities of times of random access in step S1002 is the same as the method shown in FIG. 5, and details are not described herein again.

Figure 11:
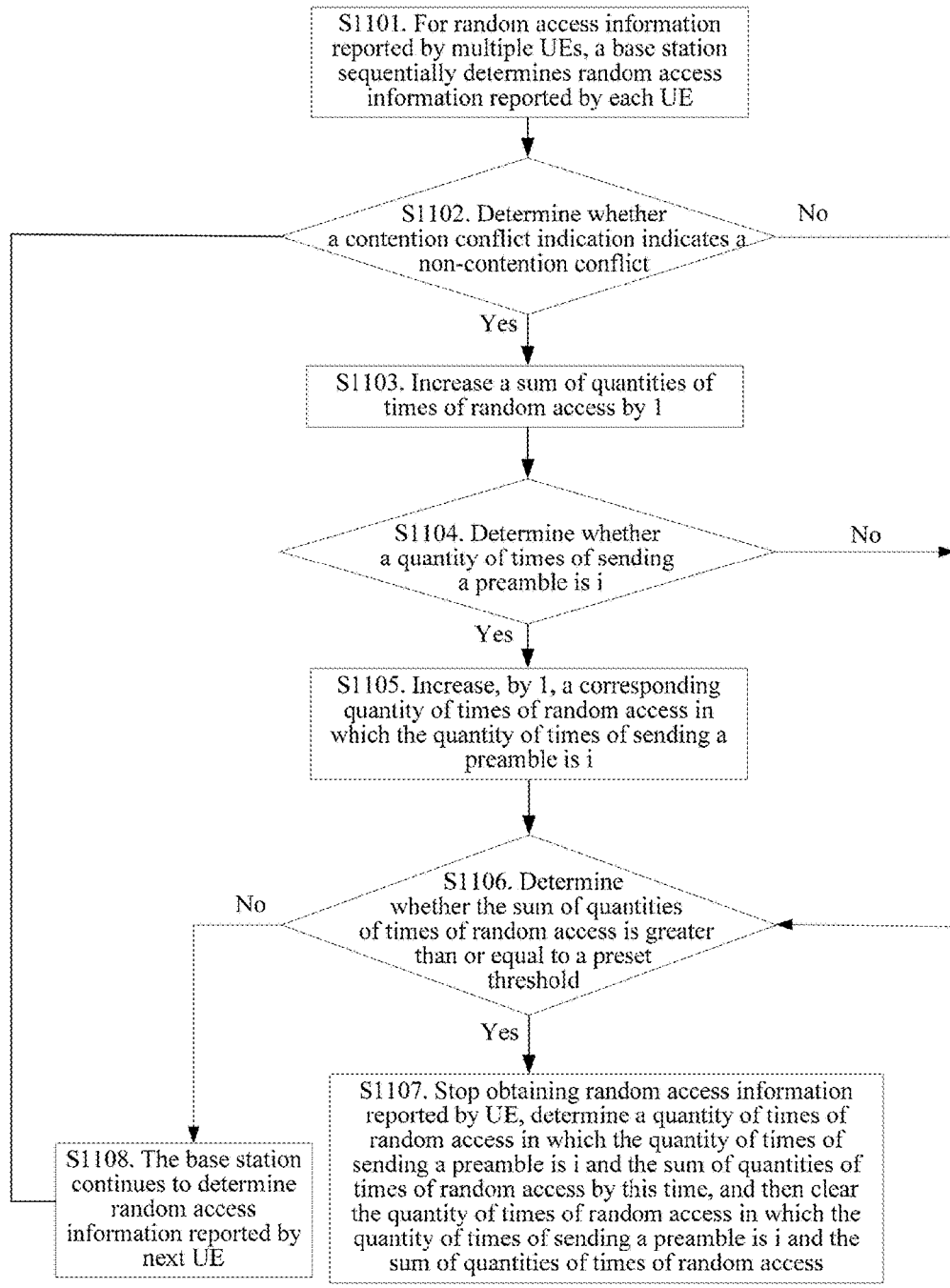
FIG. 11 is a schematic flowchart of a method for collecting, by a base station, statistics on random access information including contention conflict indication indicating a non-contention conflict according to an embodiment of the present invention.

As shown in FIG. 11, the method for collecting, by the base station, statistics on a number of times of random access in which the number of times of sending a preamble is 1 in step S1002 includes:

S1101: For the random access information reported by the multiple UEs, the base station sequentially determines random access information reported by each UE.

That is, step S1102 to step S1106 need to be performed for the random access information reported by each UE.

S1102: Determine whether a contention conflict indication indicates a non-contention conflict.

If yes, step S1103 is performed; otherwise, step S1106 is performed.

S1103: Increase a sum of a number of times of random access by 1.

S1104: Determine whether the number of times of sending a preamble is i.

If yes, step S1105 is performed; otherwise, step S1106 is performed.

S1105: Increase, by 1, a corresponding number of times of random access in which the number of times of sending a preamble is i.

For example, if it is determined that the number of times of sending a preamble is 2, a number of times of random access in which the number of times of sending a preamble is 2 is increased by 1; or if it is determined that the number of times of sending a preamble is 3, a number of times of random access in which the number of times of sending a preamble is 3 is increased by 1, and so on.

That the contention conflict indication indicates a non-contention conflict refers to that contention conflict of the UE is successfully resolved. Initial values of the sum of quantities of times of random access and the number of times of random access in which the number of times of sending a preamble is i both are 0.

S1106: Determine whether the sum of quantities of times of random access is greater than or equal to a preset threshold.

The threshold is preset by the base station. For example, the threshold may be set to 1000.

If yes, step S1107 is performed; otherwise, step S1108 is performed.

S1107: Stop obtaining random access information reported by UE, determine a number of times of random access in which the number of times of sending a preamble is i and the sum of quantities of times of random access by this time, and then clear the number of times of random access in which the number of times of sending a preamble is i and the sum of quantities of times of random access.

S1108: The base station continues to determine random access information reported by next UE.

That is, step S1102 to step S1106 are performed according to the random access information reported by the next UE, and until the sum of quantities of times of random access is greater than or equal to the preset threshold, a number of times of random access in which the number of times of sending a preamble is i and the sum of quantities of times of random access by this time are determined.

S1003: The base station determines a first random access probability and a preamble retransmission random access delay according to the random access information including contention conflict indication indicating a non-contention conflict, where the first random access probability represents a probability of random access in which the number of times of sending a preamble is 1.

Preferably, the method for determining, by the base station, a first random access probability and a preamble retransmission random access delay according to the random access information including contention conflict indication indicating a non-contention conflict includes:

using a quotient of the number of the times of random access in which the number of times of sending a preamble is 1 by the sum of quantities of times of random access as the first random access probability AP(1), that is, the first random access probability AP(1)=the number of times of random access in which the number of times of sending a preamble is 1/the sum of quantities of times of random access; and using a quotient of the number of the times of random access in which the number of times of sending a preamble is i by the sum of quantities of times of random access as a probability AP(i) of random access in which the number of times of sending a preamble is i, where the preamble retransmission random access delay is $$\sum_{i=2}^{\text{Maximum quantity of times of sending a preamble}} k(i) * AP(i)/(1 - AP(1)),$$

AP(1) represents the first random access probability, and k(i) represents a delay of random access in which the number of times of sending a preamble is i.

S1004: The base station adjusts a first random access power control parameter according to the first random access probability and adjusts a second random access power control parameter according to the preamble retransmission random access delay, where the first random access power control parameter is a preamble-initial-received-target-power, and the second random access power control parameter is a power ramping step.

Figure 12:
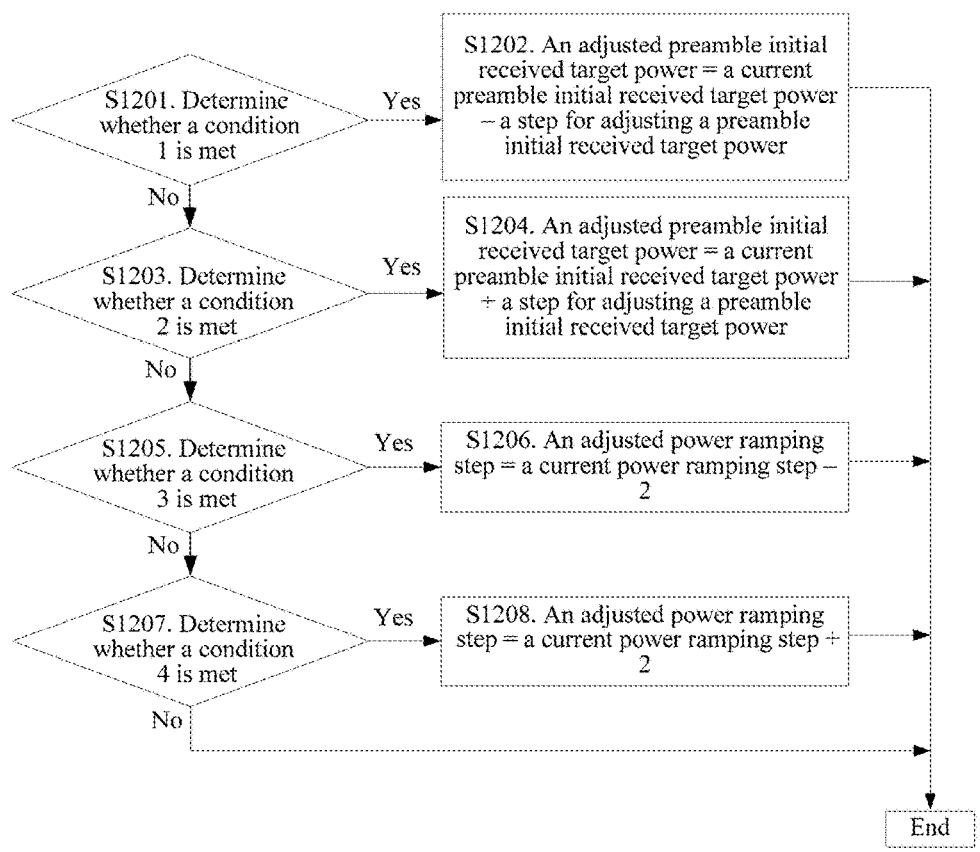
FIG. 12 is a schematic flowchart of a method for adjusting a random access power control parameter according to an embodiment of the present invention.

Preferably, as shown in FIG. 12, the method for adjusting, by the base station, a first random access power control parameter according to the first random access probability and adjusting, by the base station, a second random access power control parameter according to the preamble retransmission random access delay includes:

S1201: Determine whether a condition 1 is met.

The condition 1 is: The first random access probability>a maximum probability of successful random access in which the number of times of sending a preamble is 1, and a current preamble-initial-received-target-power>a preamble-initial-received-target-power before a first adjustment−a maximum number of times of one-way adjustments for the preamble-initial-received-target-power*a step for adjusting the preamble-initial-received-target-power.

If the condition 1 is met, step S1202 is performed; otherwise, step S1203 is performed.

S1202: An adjusted preamble-initial-received-target-power=a current preamble-initial-received-target-power−a step for adjusting a preamble-initial-received-target-power.

S1203: Determine whether a condition 2 is met.

The condition 2 is: The first random access probability<a minimum probability of successful random access in which the number of times of sending a preamble is 1, and a current preamble-initial-received-target-power<a preamble-initial-received-target-power before a first adjustment+a maximum number of times of one-way adjustments for the preamble-initial-received-target-power*a step for adjusting the preamble-initial-received-target-power.

If the condition 2 is met, step S1204 is performed; otherwise, step S1205 is performed.

S1204: The preamble retransmission random access delay<a minimum value of an average preamble retransmission random access delay, and a current power ramping step>2.

S1205: Determine whether a condition 3 is met.

The condition 3 is: The second random access probability>a maximum probability of successful random access in which the number of times of retransmitting a preamble is 1, and a current power ramping step>2.

If the condition 3 is met, step S1206 is performed; otherwise, step S1207 is performed.

S1206: An adjusted power ramping step=a current power ramping step−2.

S1207: Determine whether a condition 4 is met.

The condition 4 is: The preamble retransmission random access delay>a maximum value of an average preamble retransmission random access delay, and a current power ramping step<6.

If the condition 4 is met, step S1208 is performed.

S1208: An adjusted power ramping step=a current power ramping step+2.

The following parameters are preset by the base station, and suggested values for the parameters are shown in Table 4.

TABLE 4

| Parameter | Suggested value |
| --- | --- |
| Minimum probability of successful random access in which a number of times of sending a preamble is 1 | 85% |
| Maximum probability of successful random access in which a number of times of sending a preamble is 1 | 95% |
| Minimum value of an average preamble retransmission random access delay | 15.75 ms |
| Maximum value of an average preamble retransmission random access delay | 34.5 ms |
| Maximum number of times of one-way adjustments for a preamble-initial-received-target-power | 5 |
| Step for adjusting a preamble-initial-received-target-power | 2 dB |

Optionally, after step S1104, the base station sends a system information block SIB message that carries the adjusted preamble-initial-received-target-power and the adjusted power ramping step to the UE, so that the UE calculates a transmit power for the random access preamble according to the adjusted preamble-initial-received-targetpower and the adjusted power ramping step, and performs a subsequent process, for example, sends a preamble.

By means of Embodiment 5, random access power control parameters (a preamble-initial-received-target-power and a power ramping step) can be adaptively adjusted by a base station, UE can calculate a transmit power for a random access preamble according to adjusted random access power control parameters, and a delay of the UE in a random access process is controlled to be within an expected range.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the exemplary embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A method for adjusting a random access power control parameter, comprising:
    obtaining, by a base station, random access information reported by multiple user equipment (UEs), wherein the random access information comprises a conflict indication and a number of times of sending a preamble;
    collecting, by the base station, statistics on the random access information including a conflict indication indicating a non-contention conflict;
    determining, by the base station, a first random access probability according to the random access information including the conflict indication indicating the non-contention conflict, wherein the first random access probability represents a probability of random access in which the number of times of sending a preamble is 1; and
    adjusting, by the base station, a first random access power control parameter according to the first random access probability, wherein the first random access power control parameter is a preamble-initial-received-target-power.

2. The method according to claim 1, wherein the collecting, by the base station, statistics on the random access information including the conflict indication indicating the non-contention conflict comprises:
    collecting statistics on the random access information including the conflict indication indicating the non-contention conflict, and obtaining a number of times of random access in which the number of times of sending a preamble is 1; and
    collecting statistics on the random access information including the conflict indication indicating the non-contention conflict, and obtaining a sum of a number of times of random access; and
    determining, by the base station, the first random access probability according to the random access information including the conflict indication indicating the non-contention conflict comprises:
    using a quotient of the number of the times of random access in which the number of times of sending a preamble is 1 by the sum of quantities of times of random access as the first random access probability.

3. The method according to claim 1, wherein the adjusting, by the base station, a first random access power control parameter according to the first random access probability comprises:
    when the first random access probability>a maximum probability of successful random access in which the number of times of sending a preamble is 1, and a current preamble-initial-received-target-power>(a preamble-initial-received-target-power before a first adjustment a maximum number of times of one-way adjustments for the preamble-initial-received-target-power*a step for adjusting the preamble-initial-received-target-power), adjust the preamble initial expected received power, wherein an adjusted preamble-initial-received-target-power=(the current preamble-initial-received-target-power the step for adjusting the preamble-initial-received-target-power).

4. The method according to claim 1, wherein the adjusting, by the base station, a first random access power control parameter according to the first random access probability comprises:
when the first random access probability<a minimum probability of successful random access in which the number of times of sending a preamble is 1, and a current preamble-initial-received-target-power<(a preamble-initial-received-target-power before a first adjustment+a maximum number of times of one-way adjustments for the preamble-initial-received-target-power*a step for adjusting the preamble-initial-received-target-power), adjust the preamble initial expected received power, wherein an adjusted preamble-initial-received-target-power=(the current preamble-initial-received-target-power+the step for adjusting the preamble-initial-received-target-power).

5. The method according to claim 1, wherein the method further comprises:
determining, by the base station, a second random access probability according to the random access information including the conflict indication indicating the non-contention conflict, wherein the second random access probability represents a probability of random access in which a number of times of retransmitting a preamble is 1 in all random access of retransmission; and
adjusting, by the base station, a second random access power control parameter according to the second random access probability, wherein the second random access power control parameter is a power ramping step.

6. The method according to claim 5, wherein collecting, by the base station, the statistics on the random access information including the conflict indication indicating the non-contention conflict comprises:
collecting statistics on the random access information including the conflict indication indicating the non-contention conflict, and obtaining a number of times of random access in which the number of times of retransmitting a preamble is 1; and
collecting statistics on the random access information including the conflict indication indicating the non-contention conflict, and obtaining a sum of quantities of times of all random access of retransmission; and
determining, by the base station, the second random access probability according to the random access information including the conflict indication indicating the non-contention conflict comprises:
using a quotient of the number of the times of random access in which the number of times of retransmitting a preamble is 1 by the sum of quantities of times of all random access of retransmission as the second random access probability.

7. The method according to claim 5, wherein adjusting, by the base station, the second random access power control parameter according to the second random access probability comprises:
when the second random access probability>a maximum probability of successful random access in which the number of times of retransmitting a preamble is 1, and a current power ramping step>2, adjust the current power ramp step, wherein an adjusted power ramping step=(the current power ramping step−2); or
when the second random access probability<a minimum probability of successful random access in which the number of times of retransmitting a preamble is 1, and a current power ramping step<6, adjust the current power ramp step, wherein an adjusted power ramping step=(the current power ramping step+2).

8. The method according to claim 1, wherein the method further comprises:
determining, by the base station, a preamble retransmission random access delay according to the random access information including the conflict indication indicating the non-contention conflict; and
adjusting, by the base station, a second random access power control parameter according to the preamble retransmission random access delay, wherein the second random access power control parameter is a power ramping step.

9. The method according to claim 8, wherein the preamble retransmission random access delay is $$\sum_{i=2}^{Maximum\ quantity\ of\ times\ of\ sending\ a\ preamble} k(i)*AP(i)/(1-AP(1)),$$

wherein AP(1) represents the first random access probability, AP(i) represents a probability of random access in which the number of times of sending a preamble is i, and k(i) represents a delay of random access in which the number of times of sending a preamble is i.

10. The method according to claim 8, wherein adjusting, by the base station, the second random access power control parameter according to the preamble retransmission random access delay comprises:
when the preamble retransmission random access delay<a minimum value of an average preamble retransmission random access delay, and a current power ramping step>2, adjust the current power ramp step, wherein an adjusted power ramping step=(the current power ramping step−2); or
when the preamble retransmission random access delay>a maximum value of an average preamble retransmission random access delay, and a current power ramping step<6, adjust the current power ramp step, wherein an adjusted power ramping step=(the current power ramping step+2).

11. An apparatus, comprising:
a transceiver, configured to obtain random access information reported by multiple user equipment (UEs), wherein the random access information comprises a conflict indication and a number of times of sending a preamble;
a memory, configured to store the random access information reported by the multiple UEs; and
a processor, configured to: collect statistics on the random access information including a conflict indication indicating a non-contention conflict; determine a first random access probability according to the random access information including the conflict indication indicating the non-contention conflict, wherein the first random access probability represents a probability of random access in which the number of times of sending a preamble is 1; and adjust a first random access power control parameter according to the first random access probability, wherein the first random access power control parameter is a preamble-initial-received-target-power.

12. The apparatus according to claim 11, wherein when collecting statistics on the random access information including the conflict indication indicating the non-contention conflict, the processor is configured to:
collect statistics on the random access information including the conflict indication indicating the non-contention conflict, and obtain a number of times of random access in which the number of times of sending a preamble is 1; and
collect statistics on the random access information including the conflict indication indicating the non-contention conflict, and obtain a sum of a number of times of random access; and
when determining the first random access probability according to the random access information including the conflict indication indicating the non-contention conflict, the processor is configured to:
use a quotient of the number of the times of random access in which the number of times of sending a preamble is 1 by the sum of quantities of times of random access as the first random access probability.

13. The apparatus according to claim 11, wherein when adjusting the first random access power control parameter according to the first random access probability, the processor is configured to:
when the first random access probability>a maximum probability of successful random access in which the number of times of sending a preamble is 1, and a current preamble-initial-received-target-power>(a preamble-initial-received-target-power before a first adjustment−a maximum number of times of one-way adjustments for the preamble-initial-received-target-power*a step for adjusting the preamble-initial-received-target-power), adjust the preamble initial expected received power, wherein an adjusted preamble-initial-received-target-power=(the current preamble-initial-received-target-power−the step for adjusting the preamble-initial-received-target-power).

14. The apparatus according to claim 11, wherein when adjusting the first random access power control parameter according to the first random access probability, the processor is configured to:
when the first random access probability<a minimum probability of successful random access in which the number of times of sending a preamble is 1, and a current preamble-initial-received-target-power<(a preamble-initial-received-target-power before a first adjustment+a maximum number of times of one-way adjustments for the preamble-initial-received-target-power*a step for adjusting the preamble-initial-received-target-power), adjust the preamble initial expected received power, wherein an adjusted preamble-initial-received-target-power=(the current preamble-initial-received-target-power+the step for adjusting the preamble-initial-received-target-power).

15. The apparatus according to claim 11, wherein
the processor is further configured to: determine a second random access probability according to the random access information including the conflict indication indicating the non-contention conflict, wherein the second random access probability represents a probability of random access in which a number of times of retransmitting a preamble is 1 in all random access of retransmission; and adjust a second random access power control parameter according to the second random access probability, wherein the second random access power control parameter is a power ramping step.

16. The apparatus according to claim 15, wherein when collecting statistics on the random access information including the conflict indication indicating the non-contention conflict, the processor is configured to:
collect statistics on the random access information including the conflict indication indicating the non-contention conflict, and obtain a number of times of random access in which the number of times of retransmitting a preamble is 1; and
collect statistics on the random access information including the conflict indication indicating the non-contention conflict, and obtain a sum of quantities of times of all random access of retransmission; and
when determining the second random access probability according to the random access information including the conflict indication indicating the non-contention conflict, the processor is configured to:
use a quotient of the number of the times of random access in which the number of times of retransmitting a preamble is 1 by the sum of quantities of times of all random access of retransmission as the second random access probability.

17. The apparatus according to claim 15, wherein when adjusting the second random access power control parameter according to the second random access probability, the processor is configured to:
when the second random access probability>a maximum probability of successful random access in which the number of times of retransmitting a preamble is 1, and a current power ramping step>2, adjust the current power ramp step, wherein an adjusted power ramping step=(the current power ramping step−2); or
when the second random access probability<a minimum probability of successful random access in which the number of times of retransmitting a preamble is 1, and a current power ramping step<6, adjust the current power ramp step, wherein an adjusted power ramping step=(the current power ramping step+2).

18. The apparatus according to claim 11, wherein
the processor is further configured to: determine a preamble retransmission random access delay according to the random access information including the conflict indication indicating the non-contention conflict; and adjust a second random access power control parameter according to the preamble retransmission random access delay, wherein the second random access power control parameter is a power ramping step.

19. The apparatus according to claim 18, wherein the preamble retransmission random access delay is $$\sum_{i=2}^{\text{Maximum quantity of times of sending a preamble}} k(i)*AP(i)/(1-AP(1)),$$

wherein AP(1) represents the first random access probability, AP(i) represents a probability of random access in which the number of times of sending a preamble is i, and k(i) represents a delay of random access in which the number of times of sending a preamble is i.

20. The apparatus according to claim 18, wherein when adjusting the second random access power control parameter according to the preamble retransmission random access delay, the processor is configured to:
when the preamble retransmission random access delay<a minimum value of an average preamble retransmission random access delay, and a current power ramping step>2, adjust the current power ramp step, wherein an adjusted power ramping step=(the current power ramping step−2); or when the preamble retransmission random access delay>a maximum value of an average preamble retransmission random access delay, and a current power ramping step<6, adjust the current power ramp step, wherein an adjusted power ramping step=(the current power ramping step+2).

* * * * *